(12) United States Patent
Ushirogouchi et al.

(10) Patent No.: US 7,439,281 B2
(45) Date of Patent: Oct. 21, 2008

(54) PIGMENT DISPERSION, PRECURSOR OF INK FOR UV-CURING TYPE INK-JET RECORDING, METHOD OF INK-JET RECORDING, PRINTED MATTER, AND METHOD OF MANUFACTURING PIGMENT DISPERSION

(75) Inventors: Toru Ushirogouchi, Yokohama (JP); Ryozo Akiyama, Mishima (JP); Kazuhiko Ohtsu, Mishima (JP); Masashi Hiroki, Yokohama (JP); Mitsuru Ishibashi, Yokohama (JP)

(73) Assignee: Toshiba Tec Kabushiki Kaisha (JP)

( * ) Notice: Subject to any disclaimer, the term of this patent is extended or adjusted under 35 U.S.C. 154(b) by 614 days.

(21) Appl. No.: 10/969,203

(22) Filed: Oct. 20, 2004

(65) Prior Publication Data

US 2005/0090582 A1 Apr. 28, 2005

(30) Foreign Application Priority Data

Oct. 28, 2003 (JP) .............................. 2003-367805

(51) Int. Cl.
*C09D 11/00* (2006.01)
(52) U.S. Cl. ...................................... 523/160; 523/161
(58) Field of Classification Search ................. 523/160, 523/161
See application file for complete search history.

(56) References Cited

U.S. PATENT DOCUMENTS

| | | | |
|---|---|---|---|
| 3,150,166 | A | 9/1964 | Pohlemann et al. |
| 5,691,101 | A | 11/1997 | Ushirogouchi et al. |
| 5,889,084 | A | 3/1999 | Roth |
| 6,166,100 | A | 12/2000 | Hiwara et al. |
| 2002/0068772 | A1 | 6/2002 | Laksin et al. |
| 2002/0077385 | A1 | 6/2002 | Miyabayashi |
| 2002/0188033 | A1 | 12/2002 | Maeda |
| 2003/0135059 | A1 | 7/2003 | Matsumura et al. |
| 2003/0231234 | A1 | 12/2003 | Ushirogouchi et al. |
| 2004/0166253 | A1 | 8/2004 | Sasa |
| 2005/0113483 | A1 | 5/2005 | Takabayashi |

FOREIGN PATENT DOCUMENTS

| | | |
|---|---|---|
| DE | 100 47 622 A1 | 9/2000 |
| EP | 1 070 592 A1 | 1/2001 |
| EP | 1 167 043 A1 | 1/2002 |
| JP | 58-32674 | 2/1983 |
| JP | 11-322900 | 11/1999 |
| JP | 2001-220526 | 8/2001 |
| JP | 2002-302507 | 10/2002 |
| JP | 2003-145745 | 5/2003 |
| JP | 2004-137302 | 5/2004 |
| JP | 2005-139275 | 6/2005 |
| WO | WO 93/17867 | 9/1993 |

OTHER PUBLICATIONS

Fried, MJ et al, "Stabilisierung von Acrylmonomeren", Farbe+Lack, vol. 100, No. 8, Aug. 1994, pp. 604-609.
Communication from European Patent Office re: related application, (2005).
Communication from Japanese Patent Office regarding related application, (2006).
Communication (with translation) from Japanese Patent Office re: related application, (2007).

*Primary Examiner*—Edward J Cain
(74) *Attorney, Agent, or Firm*—Harness, Dickey & Pierce, P.L.C.

(57) ABSTRACT

There is provided a pigment dispersion comprising at least one resin-coated pigment comprising a resin and a pigment, and having an average particle diameter of 250 nm or less, and a dispersion medium containing as a major component a cation polymeric compound having a viscosity of 30 mPa.s or less at a temperature of 25° C. and a boiling point of 150° C. or more at 1 atm. The pigment is incorporated in the pigment dispersion at a ratio ranging from 3 to 41% by weight based on a total weight of the dispersion medium, and the resin is incorporated in the resin-coated pigment at a ratio ranging from 5 to 37% by weight based on the weight of the pigment.

5 Claims, 1 Drawing Sheet

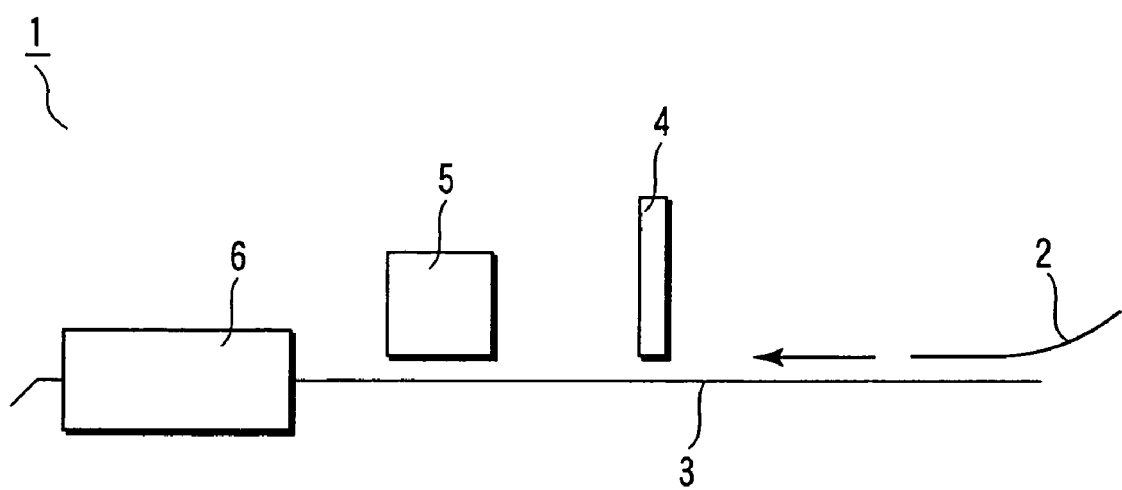
FIGURE

PIGMENT DISPERSION, PRECURSOR OF INK FOR UV-CURING TYPE INK-JET RECORDING, METHOD OF INK-JET RECORDING, PRINTED MATTER, AND METHOD OF MANUFACTURING PIGMENT DISPERSION

CROSS-REFERENCE TO RELATED APPLICATIONS

This application is based upon and claims the benefit of priority from prior Japanese Patent Application No. 2003-367805, filed Oct. 28, 2003, the entire contents of which are incorporated herein by reference.

BACKGROUND OF THE INVENTION

1. Field of the Invention

This invention relates to a pigment dispersion, a precursor of ink for UV-curing type ink-jet recording, a method of ink-jet recording, a printed matter, and a method of manufacturing a pigment dispersion.

2. Description of the Related Art

In a situation where a fairly large number of copies of printed matter are required such as in the cases of printing copies of local advertisement bill and enterprise handouts, a printing machine utilizing a form plate has been conventionally employed for meeting such requirements. In recent years however, an on-demand printer which is capable of quickly coping with the diversification of needs and of minimizing stocks has been increasingly utilized in place of the aforementioned conventional printing machine. As for such an on-demand printer, an electrophotographic printer where a toner or a liquid toner is employed as well as an ink-jet printer which is capable of achieving high-speed and high-quality printing are expected to be useful.

It is known that, as in the case of the printing machine utilizing a form plate, the on-demand printer is designed to employ a solvent type ink or a solvent type liquid toner both containing a pigment and an organic solvent. This technique of employing a solvent type ink or a solvent type liquid toner is however accompanied by a problem that the organic solvent volatilizes to such an extent that cannot be disregarded when the printing is repeated a certain number of times. Therefore, when this technique is employed, a problem of environmental contamination due to this volatilized organic solvent will be raised, thus necessitating the provision of a strict exhaust gas processing installation or a strict solvent recovery system.

On the other hand, in the case of the ink-jet printer, a solvent type ink can be handled in a closed system until the ink is discharged onto the surface of printing matter. Moreover, since the ink can be employed without substantially generating redundant ink, it is possible, through the selection of ink which is relatively safe or through the provision of suitable countermeasure for the exhaustion of solvent, to alleviate the aforementioned problem of environmental contamination.

Further, a photosensitive ink for ink-jet recording (ink-jet ink) as well as a printer system employing the photosensitive ink are now being taken notice of. This technique is characterized in that the photosensitive ink that has been delivered onto the surface of printing matter is caused to quickly photocure. A representative example of this photosensitive ink is formed of a radical polymeric monomer, a photopolymerization initiator and a pigment. There is also proposed a photopolymerizable photosensitive ink which comprises a cation polymeric monomer, a cation-generating agent and a pigment. According to these techniques, since an ink layer formed using such a photosensitive ink can be readily non-fluidized by the irradiation of light, it is possible to obtain a printed matter which is unharmful and of high-quality.

On the other hand, in the case of the ink-jet recording apparatus which is adapted to be employed in such a quick-drying printing as described above, the printing heads are generally linearly arrayed for accelerating the printing, thus making it possible to perform the printing with one pass over a printing surface. Therefore, any error in the delivery of ink would become a defective printing (missing of printing) on a line of the printed surface. Therefore, it is indispensable to make such an error zero as much as possible. Namely, it is required for an ink to be employed in the ink-jet recording that the ink is made up of materials which are excellent in stability enabling the ink to achieve very high printing accuracy and delivery stability.

The aforementioned ink of cation polymeric type has been proposed for enhancing the adhesion of the radical polymeric type ink as well as for modifying the low sensitivity, due to oxygen inhibition, of the radical polymeric type ink, so that the demand for this cation polymeric type ink is expected to increase in future. However, these photo-curing type inks for ink-jet recording are accompanied with a problem that due to high reactivity, the physical properties such as viscosity of these inks readily fluctuate to a great extent, thus making these inks inherently unstable. The reason for this can be attributed to the fact that once active species is generated on account of some sort of factor (such as heat for instance), it is difficult to easily deactivate the active species, thereby frequently allowing the dark reaction to take place in the ink. Once the viscosity, surface tension, elastic force, etc., of the ink changes on account of the dark reaction, it is more likely that the ink can be brought into a critical state such as the turbulence in trajectory configuration of ink, the deterioration of printing reproducibility, or in the worst case, the failure of delivery of ink, the clogging of ink, etc. Therefore, this problem is very serious.

Even if the aforementioned problem can be overcome, these photo-curing type inks are still accompanied with a problem that printing error may occur though the possibility of generating the printing error may be low. It is now made clear that the state of ink should be stabilized not only macrostructurally but also microstructurally. This kind of ink contains, in addition to a solvent, a pigment having quite a different physical property, and a large quantity of resinous components such as a dispersing agent. Since this kind of ink is made up of a mixture, the state of dispersion in the ink may change spontaneously as exemplified by the aggregation of pigment. This change of the state of dispersion will be further accelerated due to the aforementioned dark reaction, thus leaving a problem which the conventional photosensitive ink compositions or the conventional manufacturing methods of ink have failed to overcome.

BRIEF SUMMARY OF THE INVENTION

Therefore, one of the objects of the present invention is to provide a pigment dispersion and a liquid ink precursor both being useful for the preparation of a UV-curing type ink for ink-jet recording and featured in that they are minimal in fluctuation of viscosity, excellent in stability of components, and free from deterioration of dispersibility (incidentally, by the term "liquid ink precursor", it is intended to indicate a raw material for ink which contains at least one ink components (such for example as a liquid component, a photosensitive agent, etc.) and is excellent in dispersion of pigment and in stability of viscosity. Another object of the present invention is to provide a recording method wherein the aforementioned uv-curing type ink for ink-jet recording is employed.

A further object of the present invention is to provide a printed matter which is free from defective printing and excellent in quality of printing.

A further object of the present invention is to provide a method of manufacturing a pigment dispersion which is minimal in fluctuation of viscosity, excellent in stability of components, and free from deterioration of dispersibility.

According to one aspect of the present invention, there is provided a pigment dispersion comprising:

at least one resin-coated pigment comprising a resin and a pigment, and having an average particle diameter of 250 nm or less; and a dispersion medium containing as a major component a cation polymeric compound having a viscosity of 30 mPa.s or less at a temperature of 25° C. and a boiling point of 150° C. or more at 1 atm;

wherein a mixing ratio of the pigment is confined within the range of 3 to 41% by weight based on a total weight of the dispersion medium, and a ratio of the resin in the resin-coated pigment is confined within the range of 5 to 37% by weight based on the weight of the pigment.

According to another aspect of the present invention, there is provided a UV curing type liquid ink precursor comprising:

a pigment dispersion which comprises a resin-coated pigment comprising a resin and a pigment, and having an average particle diameter of 250 nm or less; and a dispersion medium containing as a major component a cation polymeric compound, having a viscosity of 30 mPa.s or less at a temperature of 25° C. and a boiling point of 150° C. or more at 1 atm, and containing at least one selected from the group consisting of limonene diepoxide, neopentyl glycol diglycidyl ether, di[1-ethyl(3-oxetanyl)]methyl ether and cyclohexane vinyl ether; and a photo-acid generating agent;

wherein a mixing ratio of the pigment is confined within the range of 3 to 41% by weight based on a total weight of the dispersion medium, and a ratio of the resin in the resin-coated pigment is confined within the range of 5 to 37% by weight based on the weight of the pigment.

According to a further aspect of the present invention, there is provided a method of ink-jet recording, which is featured in that an ink containing the aforementioned UW curing type liquid ink precursor is employed.

According to a further aspect of the present invention, there is provided a printed matter printed using an ink containing the aforementioned UV curing type liquid ink precursor.

According to a further aspect of the present invention, there is provided a method of manufacturing a pigment dispersion comprising:

subjecting a pigment to surface treatment to provide the pigment with a functional group to obtain a surface-modified pigment;

either coating the surface-modified pigment with a resin at a ratio of 5 to 37% by weight based on the weight of the surface-modified pigment and then dispersing the resin-coated pigment in a preliminary dispersion medium at a ratio ranging from 10% by weight to 41% by weight based on a total weight of the preliminary dispersion medium to obtain a dispersion precursor which is dispersed in the preliminary dispersion medium having a boiling point of 140° C. or less at 1 atm; or adding 10% to 41% by weight (based on a total weight of a preliminary dispersion medium) of the surface-modified pigment and 5 to 37% by weight (based on the surface-modified pigment) of the resin to the preliminary dispersion medium having a boiling point of 140° C. or less at 1 atm to obtain a dispersion precursor where the resin-coated pigment composed of the surface-modified pigment and the resin is dispersed in the preliminary dispersion medium;

adding a main dispersion medium having a viscosity of 30 mPa.s or less at a temperature of 25° C. and a boiling point of 150° C. or more at 1 atm to the dispersion precursor and mixing them to obtain a mixture; and subjecting the mixture to distillation at a temperature of not higher than 70° C. and under a reduced pressure to remove the preliminary dispersion medium to obtain the pigment dispersion where the resin-coated pigment is dispersed in the main dispersion medium.

Additional objects and advantages of the invention will be set forth in the description which follows, and in part will be obvious from the description, or may be learned by practice of the invention. The objects and advantages of the invention may be realized and obtained by the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

FIGURE is a schematic view of the ink-jet recording apparatus adapted to be employed that can be employed in the recording method according to one embodiment of the present invention.

DETAILED DESCRIPTION OF THE INVENTION

Next, various embodiments of the present invention will be explained in detail as follows.

The pigment dispersion according to one embodiment of the present invention comprises a specific dispersion medium, and a resin-coated pigment dispersed in the dispersion medium. As for the pigment component constituting the resin-coated pigment, it is possible to employ any kind of pigment which is conventionally known useful as a coloring material and inherently capable of being dispersed. In the case of cation-curing type materials in particular, since an acid will be employed in the mechanism involving the cation-curing type materials, it is preferable to employ pigments which can be hardly discolored.

Examples of pigments useful in this case include photoabsorption pigments. Specific examples of such photoabsorption pigments include carbonaceous pigment such as carbon black, carbon refined and carbon nanotube; metal oxide pigments such as iron black, cobalt blue, zinc oxide, titanium oxide, chromium oxide and iron oxide; sulfide pigments such as zinc sulfide; phthalocyanine pigments; pigments formed of salts such as metal sulfate, metal carbonate, metal silicate and metal phosphate; and pigments formed of metal powder such as aluminum powder, bronze powder and zinc powder.

Further, it is also possible to employ organic pigments including, for example, dye chelate; nitro pigments; nitroso pigments such as aniline black and naphthol green B; azo pigments such as Bordeaux 10B, Lake red 4R and chromophthal red (including azo lake, insoluble azo pigment, condensed azo pigment, chelate azo pigment); Lake pigments such as Peacock blue lake and Rhodamine lake; phthalocyanine pigments such as phthalocyanine blue; polycyclic pigments (such as perylene pigment, perinone pigment, anthraquinone pigment, quinacridone pigment, dioxane pigment, thioindigo pigment, isoindolinone pigment, quinophthalene pigment, etc.); threne pigments such as thioindigo red and indanthrone blue; quinacridine pigment; and isoindolinone pigment.

As for the pigments that can be employed in the manufacture of a black ink, it is preferable to employ carbon black-based pigments. For example, it is possible to employ pigments such as Raven 5750, Raven 5250, Raven 5000, Raven 3500, Raven 1255 and Raven 700 (all available from Colombia Co., Ltd.); Regal 400R, Regal 330R, Regal 660R, Mogul L, Monarch 700, Monarch 800, Monarch 880, Monarch 900, Monarch 1000, Monarch 1100, Monarch 1300 and Monarch 1400 (all available from Cabot Co., Ltd.); No. 2300, No. 900, MCF88, No. 33, No. 40, No. 45, No. 52, MA7, MA8, MA100 and No. 2200B (all available from Mitsubishi Chemical Co., Ltd.); Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A and Special Black 4 (all available from Dexa Co., Ltd.).

As for the yellow pigments that can be employed in a yellow ink, examples thereof include C.I. Pigment Yellow 128, C.I. Pigment Yellow 129, C.I. Pigment Yellow 151, C.I. Pigment Yellow 154, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 139, C.I. Pigment Yellow 150 and Pigment Yellow 180. In particular, it is preferable to employ imidazolone-based pigments, since they can be hardly discolored by the effect of oxygen. Among them, Pigment Yellow 180 is most preferable.

As for the pigments that can be employed in a magenta ink, examples thereof include C.I. Pigment Red 123, C.I. Pigment Red 168, C.I. Pigment Red 184, C.I. Pigment Red 202, C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 57:1, C.I. Pigment Red 112 and Pigment Violet 19. In particular, it is preferable to employ quinacridone-based pigments, since they can be hardly discolored by the effect of oxygen. Among them, Pigment Red 122 and Pigment Red 57:1 which is excellent in dispersibility are most preferable.

Further, as for the pigments that can be employed in a cyanine ink, examples thereof include C.I. Pigment Blue 15:3, C.I. Pigment Blue 15:34, C.I. Pigment Blue 16, C.I. Pigment Blue 22, C.I. Pigment Blue 60, C.I. Pigment Blue 1, C.I. Pigment Blue 2, C.I. Pigment Blue 3, C.I. Vat Blue 4, and C.I. Vat Blue 60. In particular, it is preferable to employ phthalocyanine-based pigments, since they can be hardly discolored by the effect of oxygen. Among them, Pigment Blue 15:3 is most preferable.

Further, it is also useful, as a coloring component, to employ white pigments such as natural clay, white lead, zinc white and metal carbonates such as magnesium carbonate, metal oxides such as barium and titanium. The liquid ink containing white pigments can be employed not only in white printing but also in the amendments of printing or underlying images through overwriting.

As for the pigments that can be utilized as a coloring component, there is not any particular limitation and any pigments can be employed as long as they are capable of exhibiting optical coloring and tinting functions which the pigments are required to have. The pigments useful in this case may be those which are capable of exhibiting, in addition to the coloring and tinting properties, other characteristics such as magnetism, fluorescence, electric conductivity or dielectric property. If the pigments are provided with such other properties, it is possible to provide an image with various functions. Further, these pigments may contain the powder that is useful in enhancing the heat resistance or physical strength of ink.

As for fluorescent pigments, it is possible to employ not only inorganic fluorescent materials but also organic fluorescent materials. As for the inorganic fluorescent materials, examples of which include $MgWO_4$, $CaWO_4$, $(Ca,Zn)(PO_4)_2:Ti^+$, $Ba_2P_2O_7:Ti$, $BaSi_2O_5:Pb^{2+}$, $Sr_2P_2O_7:Sn^{2+}$, $SrFB_2O_{3.5}:Eu^{2+}$, $MgAl_{16}O_{27}:Eu^{2+}$, and inorganic acid salts such as tungstenate and sulfate. As for the organic fluorescent materials, examples of which include acridine orange, amino acridine, quinacrine, anilinonaphthalene sulfonate derivatives, anthroyl oxystearic acid, auramine O, chlorotetracycline, cyanine dye such as merocyaninen and 1,1'-dihexyl-2,2'-oxacarboxycyanine, dansyl sulfonamide, dansyl choline, dansyl galacside, dansyl tolidine, dansyl chloride derivatives such as dansyl chloride, diphenyl hexatriene, eosin, ε-adenosine, ethidium bromide, fluorescein, foamycine, 4-benzoylamide-4'-aminostilbene-2,2'-sulfonic acid, β-naphthyl triphosphic acid, oxonol dye, parinaric acid derivatives, perylene, N-phenylnaphthyl amine, pyrene, safranine O, fluorescamine, fluorescein isocyanate, 7-chloronitrobenzo-2-oxa-1,3-diazole, dansylaziridine, 5-(iodoacetamide ethyl) aminonaphthalene-1-sulfonic acid, 5-iodoacetamide fluorescein, N-(1-anilinonaphthyl 4) maleimide, N-(7-dimethyl-4-methylcumanyl) maleimide, N-(3-pyrene) maleimide, eosin-5-iodoacetamide, fluorescein mercury acetate, 2-[4'-(2"-iodoacetamide)]aminonaphthalene-6-sulfonic acid, eosin, Rhodamine derivatives, organic electroluminescent dye, organic electroluminescent polymer, organic electroluminescent crystal and dendrimer.

As for the powder to be employed for enhancing the heat resistance and physical strength of ink layer, examples of which include oxides or nitrides of aluminum and silicon, filler and silicon carbide. For the purpose of providing the ink layer with electric conductivity, the ink may further contain conductive carbon pigment, carbon fiber, or powder of copper, silver, antimony and other noble metals. Iron oxide powder and ferromagnetic powder are suited for use in providing the ink layer with magnetic property. It is also possible to incorporate metal oxide powder such as tantalum oxide or titanium oxide exhibiting high dielectricity into the recording ink.

It is also possible, for the purpose of adjusting the colors, to incorporate dyes as an auxiliary component of pigment into the ink. For example, dyes which are low in acidity and basicity and excellent in solubility to a solvent, such as azoic dye, sulfur (building materials) dye, disperse dye, fluorescent brightening agent and oil soluble dye can be employed. Among them, it is more preferable to employ oil soluble dye such as azo dye, triaryl methane dye, anthraquinone dye and azine dye. Specific examples of such oil soluble dye include C.I. Slovent Yellow-2, 6, 14, 15, 16, 19, 21, 33, 56, 61 and 80; Diaresin Yellow-A, F, GRN and GG; C.I. Slovent Violet-8, 13, 14, 21 and 27; C.I. Disperse Violet-1; Sumiplast Violet RR; C.I. Slovent Blue-2, 11, 12, 25 and 35; Diresin Blue-J, A, K and N; Orient Oil Blue-IIN, #603; and Sumiplast Blue BG.

These pigments and dyes described above may be employed singly or in combination of two or more for the purpose of enhancing the photoabsorbance, saturation and color vision.

The content of the aforementioned pigments in the pigment dispersion according to the embodiments of the present invention should be confined within the range of 3 to 41% by weight based on a total weight of the dispersion medium. If the content of the pigments is less than 3% by weight, it would become difficult to secure a sufficient color density if the pigment dispersion is used as a coloring material in the subsequent processing step. On the other hand, if the content of the pigments is increased over 41% by weight, the stability of the pigment dispersion would deteriorate. Therefore, the content of the pigments in the pigment dispersion should more preferably be confined within the range of 3 to 28% by weight based on a total weight of the dispersion medium.

In order to enable a prescribed quantity of pigment to uniformly disperse in a dispersion medium, the pigment dispersion according to the embodiments of the present invention is formulated in such a manner that the pigment therein is combined with a resin employed as a dispersion medium and hence turned into a resin-coated pigment. The resin in this case functions in such a manner that the resin interposes between pigment particles to prevent the aggregation of the pigment particles and that the affinity of the pigment to the dispersion medium is enhanced by the resin to prevent the pigments from being precipitated. As for the resin, it is fundamentally possible to employ any resin which is excellent in affinity to the dispersion medium and capable of exhibiting stereo-separating property for preventing the aggregation of pigments. For example, it is possible to employ a resin comprising, as a major component, at least one selected from the group consisting of vinyl polymer or copolymer, acrylic polymer or copolymer, polyester, polyamide, polyimide, polyurethane, amino-based polymer, silicon-containing polymer, sulfur-containing polymer, fluorine-containing polymer and epoxy resin.

In order to enable these polymers to function as a dispersion medium, it is preferable that the terminals of these polymers are provided with bonding property or affinity to the pigment. On the other hand, the main chain of these polymers should preferably be provided with affinity to a solvent as well as with physical repulsive force or electrostatic repulsive force for preventing the reaggregation among pigment particles. For example, it is preferable to employ polymers having a solubility parameter which is substantially the same (about ±5 $MPa^{1/2}$) as that of the dispersion medium, a molecular weight ranging from several hundreds to tens of thousands, a polymerization degree ranging from 10 to about 200, and a Tg ranging from 10° C. to 200° C. Furthermore, it is desirable to employ polymers whose terminals are capable of exhibiting a relatively strong chemical bonding property (such as covalent bond, electrostatic force), thus exhibiting excellent affinity to the pigments. Generally, it is possible to provide the resin with the aforementioned composite functions by forming the resin as a copolymer comprising two or more monomers.

The aforementioned terminal of polymer may not necessarily be limited to only one, but may be generally introduced into a distal end of a graft copolymer or into a tendam end of a tandem polymer. These polymers are not only strong in bonding property but also liable to form steric hindrance which is effective in suppressing the reaggregation among pigment particles.

As for the monomers for synthesizing such polymers, specific examples thereof include styrene, substituted styrene, (metha)acrylic ester, (metha)acrylic acid, (metha)acrylic amide, maleic acid, maleic anhydride, maleic ester, itaconic acid, itaconic ester, hydroxystyrene and hydrogen atom-substituted derivatives of hydroxystyrene. Polymers having an ester side chain provided with long chain alkyl, polyether, polycarbonate or polyester are advantageous in creating the aforementioned tendam polymer.

Furthermore, it is possible to employ the following compounds as a polymer useful in this case. Namely, they include polyester compounds which can be obtained through dehydrocondensation between a dihydroxy compound and dicarboxylic acid such as poly(oxyphthaloyloxymethylene-1,4-phenylenemethylene) and poly(1,4-cyclohexylenedimethylene succinate); polyamides which can be obtained through condensation among adipic acid, diamine such as hexamethylene diamine and dicarboxylic acid, or through ring-opening of cyclic lactone such as ϵ-caprolactam; some polyamides which are relatively low in Tg and can be obtained through condensation between tetracarboxylic acid such as pyromellitic acid and aliphatic diamine; polyurethane resin which can be obtained through a reaction between isophorone dicyanate or aliphatic diisocyanate and dihydroxy compound; polyvinyl pyridine compounds; polydimethyl siloxane and ladder polymers thereof; polyvinyl alcohols; polyvinyl ethers; and polyether-based polymer which can be obtained through polymerization of an oxirane compound having a relatively rigid skeleton. The terminals of these polymers may be capped with a compound having a functional group exhibiting affinity to pigments such as amino group, phosphoric group, etc.

It is also possible to preferably employ a high-molecular compound which can be obtained through polymerization between a polymeric surfactant having a polymeric group as well as an amphipathic group and a crosslinking monomer and/or a monofunctional monomer. As for the polymeric group in the polymeric surfactant, it is preferable to select an unsaturated hydrocarbon group such as a vinly group, allyl group, acryloyl group, methacryloyl group, propenyl group, vinylidene group and vinylene group. These groups may be employed singly or in combination of two or more. As for the hydrophilic group in the polymeric surfactant, it can be selected depending on the kind of the dispersion medium. If this dispersion medium is aqueous, it is possible to preferably employ at least one selected from the group consisting of a sulfone group, sulfonic acid group, carboxyl group, carbonyl group, hydroxyl group and salts of these groups. On the other hand, if this dispersion medium is oily, it is possible to preferably employ a carboxyl group or esters thereof, lactone-based compounds, a carbonyl group, hydroxyl group, etc.

In order to enhance the dispersion stability of the pigment, it is more preferable to treat the aforementioned polymers and pigments so as to form a covalent bond between them or to form a microcapsulized pigment. The manufacture of this microcapsulized pigment can be performed by any known methods. For example, it is possible, without any limitation, to employ a phase separation method (coacervation), a submerged drying method (interfacial precipitation method), a spray drying method, a pan coating method, a submerged cure-coating method, an interfacial polymerization method, an in-situ method, an ultrasonication method, etc. More specifically, it is possible to employ the method of manufacturing anionic microcapsulized pigment which is described in Japanese Laid-open Patent Publication (Kokai) No. 9-151342 (1997) or the method which is described in Japanese Laid-open Patent Publication (Kokai) No. 10-316909 (1998). By using any of these methods, the resin-coated pigments according to the embodiments of the present invention will be manufacture.

The ratio of the resin in the resin-coated pigments should preferably be confined within the range of 5 to 37% by weight based on the pigments. If the ratio of the resin falls outside this range, it would be impossible to obtain a dispersion which is excellent in stability of dispersion and has a suitable viscosity. Namely, if the ratio of the resin is too small, the stability of dispersion of the resin-coated pigments would be considerably deteriorated. On the other hand, if the ratio of the resin is too large, the dispersed body of the resin-coated pigments would become too large in consistency, thus degraeding the delivery stability of ink especially when the ink is to be employed in the ink-jet recording. A more preferable range of the ratio of resin differs more or less depending on the kind of pigment. For example, in the case of carbon black, the ratio of the resin should preferably be confined within the range of 10 to 30% by weight based on the pigment. In the case of color pigments, for example, in the case of benzimidazolone-based yellow pigment, the ratio of the resin should preferably be confined within the range of 15 to 39% by weight based on the pigment; in the case of phthalocyanine-based cyan pigment, the ratio of the resin should preferably be confined within the range of 10 to 30% by weight based on the pigment, and in the case of quinacridone-based magenta pigment, the ratio of the resin should preferably be confined within the range of 20 to 39% by weight based on the pigment.

Next, there will be discussed about the average particle diameter of the resin-coated pigment containing a prescribed ratio of a resin. In the case of the ink-jet ink, an average particle diameter of colorant component and of the powder component should be as small as possible, provided that it would not badly affect the weather resistance of coloring material. Generally speaking, the particles that would give rise to problems in the delivery of ink through a nozzle are typically particles or aggregated particles having a particle diameter of 1 µm or more. Therefore, the average particle diameter of the resin-coated pigment should preferably be limited to 0.35 µm or less, more preferably to the range of 0.05 to 0.25 µm. If the average particle diameter of the resin-coated pigment is less than this lower limit, the weather resistance of the pigment may be deteriorated.

In order to make the pigment dispersion according to the embodiments of the present invention applicable to ink-jet recording in particular, the viscosity of dispersion liquid comprising this pigment dispersion should desirably be confined to 100 mPa.s or less at a temperature of 25° C. in general (generally, the viscosity of a dispersion medium is limited, at maximum, to about 30 mPa.s). In order to control the viscosity of dispersion liquid so as to make it fall within this range of viscosity, the pigment is dispersed as a resin-coated pigment in a predetermined dispersion medium. In the embodiments of the present invention, a dispersion medium comprising as a major component a cationic polymeric compound and having a viscosity of 30 mPa.s or less at a temperature of 25° C. and a boiling point of 150° C. or more at 1 atm is employed. As an upper limit of the viscosity of the dispersion medium is confined as described above, it is now possible to enhance the dispersion property of the resin-coated pigment, and furthermore, as the lower limit of the boiling point of the dispersion medium is confined as described above, it is now possible to minimize harmful volatile components contained in the dispersion liquid. If the viscosity of the dispersion medium exceeds 30 mPa.s, it may become difficult to perform a normal delivery of ink especially when the dispersion medium is employed for formulating an ink-jet ink.

Incidentally, by the expression of: "containing as a major component a cation polymeric compound", it is intended, in a specific sense, to indicate that the cation polymeric compound occupies 80% or more in a total weight of a dispersion medium.

As long as the aforementioned conditions with regard to viscosity and boiling point are satisfied, any dispersion medium can be employed and moreover, the dispersion medium can be employed singly or in combination of two or more. Specific examples of this dispersion medium include compounds having a molecular weight of not more than 1000 and comprising a cyclic ether group such as an epoxy group, oxetane group and oxolane group; acrylic or vinyl compounds having the aforementioned substituent groups; carbonate compounds; low molecular weight melamine compounds; vinyl ethers; vinyl carbazoles; styrene derivatives; alpha-methyistyrene derivatives; vinyl alcohol esters including esters of vinyl alcohol with acryl or methacryl; and monomers having a cation polymerizable vinyl bond. These compounds can be employed in combination thereof.

When the dispersion medium contains a compound having an aliphatic skeleton or an alicyclic skeleton, the transparency of cured material can be enhanced and at the same time, the dispersion medium would be provided with a suitable thermoplasticity and resolubility. Therefore, when the dispersion medium is employed for formulating a photosensitive ink, the sensitivity, fixability, transferability and maintenance of the ink can be enhanced.

As long as the quantity to be added is limited, the dispersion medium may further contain a compound having a relatively high molecular weight and a high viscosity such as a substance which is solid at the ordinary temperatures. The inclusion of such a compound makes it possible to enhance the flexibility of a cured matter and also to enhance the dispersibility of pigments. Further, when the dispersion medium contains a compound which is large in valency and high in reactivity, the hardness of the cured substance or the resistance to solvent can be enhanced. Specific examples of such a compound include compounds having a molecular weight of not more than 5000 and comprising a cyclic ether group such as an epoxy group, oxetane group and oxolane group, which are bonded through a long chain alkylene group; acrylic or vinyl compounds having the aforementioned substituent groups; carbonate compounds; low molecular weight melamine compounds; vinyl ethers; vinyl carbazoles; styrene derivatives; alpha-methylstyrene derivatives; vinyl alcohol esters including esters of vinyl alcohol with acryl or methacryl; monomers having a cation polymerizable vinyl bond; and oligomers formed through the polymerization of at least one of such monomers.

Further, the dispersion medium may contain, in addition to the aforementioned compounds, at least one compound selected from the group consisting of a homopolymer or copolymer of vinyl alcohol; acid-reactive/dehydrocondensing resins containing an OH group, COOH group, acetal group, etc., and having a molecular weight of 5000 or less such as casein and cellulose; polycarbonate resins having a molecular weight of 5000 or less; copolymers to be derived from a reaction between polyamic acid, polyamino acid or acrylic acid and a vinyl compound having an acid polymerizable double bond on its side chain; copolymers to be derived from a reaction between vinyl alcohol and a vinyl compound having an acid polymerizable double bond on its side chain; and methylol melamine resin.

When an epoxy compound is to be employed as a dispersion medium, the following compounds can be employed. Namely, compounds having a hydrocarbon group having 1 to 15 carbon atoms and bivalent aliphatic or alicyclic skeleton; or compounds having an epoxy or alicyclic epoxy group at one or both sites of a bivalent group having, at a portion thereof, an aliphatic chain or alicyclic skeleton (ether bond or ester bond may be included in the skeleton) can be employed.

As for specific examples of such epoxy compounds, they include alicyclic epoxy compounds such as Celloxide 2021, Celloxide 2021A, Celloxide 2021P, Celloxide 2081, Celloxide 2000 and Celloxide 3000 (all available from Daicel Chemical Industries Ltd.); (metha)acrylate compounds having an epoxy group, such as Cyclomer A200 and Cyclomer M100; methacrylate having a methylglycidyl group such as MGMA; glycidol representing a low molecular epoxy compound; β-methylepichlorohydrin; α-pinene oxide; α-olefin monoepoxide having 12 to 14 carbon atoms; α-olefin monoepoxide having 16 to 18 carbon atoms; epoxidized soy bean oil such as Dimac S-300K; epoxidized linseed oil such as Dimac L-500; and polyfunctional epoxy compounds such as Epolead GT301 and Epolead GT401. It is also possible to employ alicyclic epoxy compounds. (such as Cylacure; Dow Chemical Co., Ltd, U.S.); low molecular weight phenol compounds which are hydrogenated and aliphatized with terminal hydroxyl group thereof being substituted by a group having epoxy; glycidyl ether of polyhydric aliphatic alcohol/alicyclic alcohol such as ethylene glycol, glycerin, neopentyl alcohol, hexanediol and trimethylol propane, and glycidyl esters of hexahydrophthalic acid or hydrogenated aromatic polyhydric carboxylic acid.

Further, as long as the quantity to be added is confined to such that would not increase the viscosity exceeding the upper limit thereof, the ink may include a transparent liquid epoxy resin which is excellent in weather resistance and high in Tg. For example, epoxidized polybutadiene such as Epolead PB3600 and PB3600M, EHPE3150 and EHPE3150CE (trademark, Daicel Chemical Industries., Ltd.) may be included in the ink. In addition to these epoxy resins, it is also possible to incorporate lactone-modified alicyclic epoxy resin, examples of which including Placcell GL61, GL62, G101, G102, G105, G401, G402, G403X (trademark, Daicel Chemical Industries., Ltd.).

Among these alicyclic epoxy compounds, Celloxide 2000, Celloxide 3000 and α-pinene oxide ethylene glycol are preferable in terms of viscosity and volatility. In particular, limonene diepoxide (product name: Celloxide 3000) can be preferably employed, since this compound is excellent in dispersibility and in odor safety.

Generally speaking, the aliphatic epoxy compounds are poor in acid polymerizability. However, some of the aliphatic epoxy compounds are prominently excellent in storage stability as they are employed as a dispersion medium. Moreover, since they exhibit a certain degree of acid polymerizability, these epoxy compounds can be preferably employed as a dispersion medium in the embodiments of the present invention. Especially, the epoxy compounds that can be represented by the following general formula (1) are useful in further enhancing the viscosity stability and dispersibility.

$$R^{11}-R^{12}-R^{11} \quad (1)$$

Wherein $R^{11}$ is glycidyl ether group; $R^{12}$ is an alkylene or hydroxyl-substituted alkylene group having 1 to 6 carbon atoms, or an alkylene group having an alicyclic or hydroxyl-substituted alicyclic skeleton and 6 to 15 carbon atoms; and j is an integer ranging from 1 to 3.

Among these compounds, it is preferable to employ compounds that can be obtained through the modification of alcohols such as glycerin, neopentyl polyhydric alcohol or hexanediol into glycidyl ethers. Especially, diglycidyl ether having a neopentyl skeleton (trade name: SR-NPG (Sakamoto Yakuhin Co., Ltd.)) exhibits such excellent properties that are almost unique.

Usually, epichlorohydrin is employed in the manufacture of aliphatic epoxy compounds, so that the resultant compounds inevitably contain in their components a halogen which may be chlorine occasionally. This chlorine source is likely to generate a substance which is harmful to the environments as this chlorine source is incinerated. Therefore, it is necessary to minimize by all means the content of chlorine in the resultant pigment dispersion. Specifically, the content of chlorine in the pigment dispersion should preferably be limited to less than 1%. Such a low content of chlorine can be achieved by the employment of an aliphatic epoxy compound which is purified through distillation.

Incidentally, this pigment dispersion is employed for the preparation of an ink-jet ink, which is then employed for performing recording to produce a printed matter. This printed matter is required to have specific properties which differ depending on the specific use thereof. For instance, when this printed matter is to be applied to the outer surface of a can or a PET bottle, or to the outer surface of a container made of an oily material, the printed images on the printed matter are required to be excellent in solvent resistance. Further, in order to cope with a high-speed printing, the ink may be required to be cured at a higher curing rate.

In that case, the dispersion medium may further contain, in addition to the aforementioned alicyclic or aliphatic epoxy compounds, compounds having a phenolic hydroxyl group as described above (for example, glycidyl ether of phenol A, and glycidyl ether of phenolic oligomer including phenol novolac and polyhydroxystyrene), or ordinary aromatic epoxy compounds such as styrene oxide in such a quantity that would not increase the viscosity exceeding the upper limit thereof.

Moreover, the dispersion medium may contain various compounds depending on the properties desired or on the conditions at the time of recording. For example, in a situation where high-speed printing of several tens of meters per minute is demanded or where resistance to a solvent is required, it is preferable that an oxetane compound is incorporated in the dispersion medium. However, since the dispersion medium comprising an aromatic oxetane compound as a major component is high in viscosity, it is desirable that the compound to be incorporated in the dispersion medium in this case is selected from an aliphatic oxetane compound of low viscosity, an oxetane (metha)acrylate compound, and a cation polymeric compound of low viscosity such as a vinyl ether compound. The aliphatic oxetane may include an ether bond in part of the structure thereof.

Specific examples of aliphatic or alicyclic oxetane compounds of bi- or more valence include di[1-ethyl(3-oxetanyl)] methyl ether, 3-ethyl-3-(2-ethylhexyloxymethyl) oxetane, [(1 ethyl 3 oxetanyl)methoxy] cyclohexane, compounds comprising an alicyclic group such as bis[(1-ethyl-3-oxetanyl)methoxy] cyclohexane or bis[(1-ethyl-3-oxetanyl)methoxy] norbornane, to which at least one oxetane-containing group is introduced, and ether compounds comprising aliphatic polyhydric alcohol such as ethylene glycol, propylene glycol and neopentyl alcohol, to which oxetane-containing alcohol such as 3-ethyl-3-hydroxymethyl oxetane is dehydro-condensed. The aforementioned aliphatic or alicyclic oxetane compounds can be manufactured by any known method such as a desalting reaction between 3-ethyl-3-methyloxetane halide and an alkali metal salt of corresponding alcohol.

Specific examples of the oxetane compounds comprising an aromatic skeleton include 1,4-bis[(1-ethyl-3 oxetanyl) methoxy] benzene, 1,3-bis[(1-ethyl-3 oxetanyl)methoxy]

benzene, 4,4'-bis[(3-ethyl-3 oxetanyl)methoxy) biphenyl, and phenol novolac oxetane. Especially when di[1-ethyl(3-oxetanyl)]methyl ether which is known as OXT-221 (Toa Gosei Co., Ltd.) or an acrylic or methacrylic compound having an oxetane group on a side chain thereof is employed, not only the rise of viscosity in particular can be suppressed but also a cure-accelerating effect of almost the same degree as that of other oxetane compounds can be obtained.

In a situation where a further reduction of viscosity and a further enhancement of curing rate are required in addition to the aforementioned enhanced curing rate and solvent resistance of printed image, it is preferable to employ vinyl ether compounds represented by the following general formula (2) as one component of the dispersion medium. These vinyl ether compounds can be employed singly or as a mixture of two or more. Incidentally, as for these vinyl ether compounds, ones which are bonded to methylene group of aliphatic glycol derivatives or of cyclohexane dimethanol are generally well known. Such vinyl ether compounds are accompanied with problems that they are poor in cation polymerizability and that the polymerization thereof is considerably obstructed by the presence of pigment. Whereas the compounds having a vinyl ether group which is directly attached to a cyclic skeleton such as an alicyclic skeleton, a terpenoid skeleton or an aromatic skeleton as represented by the following general formula (2) are excellent in curability even if a pigment co-exists therewith and are therefore preferable for use.

$$R^{13}-R^{14}-(R^{13})_p \quad (2)$$

Wherein $R^{13}$(s) is a group selected from vinyl ether group and hydroxyl group wherein at least one of $R^{13}$(s) is a vinyl ether group; $R^{14}$ is a cyclic group having a valence of (p+1) and selected from an alicyclic skeleton and a skeleton having an aromatic ring; and p is a positive integer including zero; with a proviso that if $R^{14}$ is a cyclohexane cyclic skeleton and p is zero, at least one of the carbon atoms located in the ring constitutes a ketone structure.

As for the cyclic group $R^{14}$, it is possible to employ groups having a valence of (p+1) such as a benzene ring, naphthalene ring and biphenyl ring; or groups having a valence of (p+1) that can be derived from a cycloalkane skeleton, norbornane skeleton, adamantane skeleton, tricyclodecane skeleton, tetracyclododecane skeleton, terpenoid skeleton or cholesterol skeleton.

More specific examples of group $R^{14}$ include the compounds comprising alicyclic polyols such as cyclohexane (poly)ol, norbornane(poly)ol, tricyclodecane(poly)ol, adamantane(poly)ol, benzene(poly)ol, naphthalene(poly)ol, anthracene(poly)ol and biphenyl(poly)ol; and phenolic derivatives; wherein the hydrogen atom of the hydroxyl group of the alicyclic polyols or of the phenolic derivatives is substituted by vinyl group. It is also possible to employ the compounds comprising polyvinylphenol or polyphenol compound such as phenol novolac wherein the hydrogen atom of the hydroxyl group thereof is substituted by a vinyl group. These compounds described above may be such that some of the hydroxyl groups thereof are left to remain or some of the methylene atoms of the alicyclic skeleton are substituted by a ketone group. Such a substitution of groups is preferable in view of reducing the volatility of the compounds.

In particular, since a cyclohexyl monovinyl ether compound is high volatility, if this cyclohexyl monovinyl ether compound is to be employed, at least the cyclohexane ring should preferably be oxidized into a cyclohexanone ring. As for the method of synthesizing the aforementioned vinyl ether compound, the synthesizing method proposed by Ishii et al in J. Am. Chem. Soc., Vol. 124, No. 8,1590 (2002) and employing a corresponding alcohol compound as a raw material can be suitably employed for the manufacture of the vinyl ether compound.

Divinyl ether of cyclohexane diol is preferable for use as a dispertion medium since it is relatively high in acid reactivity among the vinyl ether compounds. However, compared with other ether compounds, divinyl ether of cyclohexane diol is more or less higher in hydrophobicity. Therefore, it is preferable in the employment of divinyl ether of cyclohexane diol to concurrently incorporate an acid polymeric compound containing a large number of oxygen and exhibiting a high polarity, thereby enhancing the dispersion stability of this vinyl ether compound. The examples of such a compound useful in this case include compounds having, in their skeletons, a plurality of cyclic ethers, cyclic carbonates or cyclic lactones for instance.

As for the method for dispersing a pigment in the aforementioned dispersion medium to obtain the pigment dispersion according to the embodiments of the present invention, it is possible to adopt various dispersion methods. They can be generally classified into a media-less dispersion method and a media dispersion method using a medium. Typical examples of the media-less dispersion method include ultrasonic dispersion, jetstream dispersion, dispersion using a high-speed disc plate, dispersion using a homogenizer. On the other hand, as for the media dispersion method, there is known a method using hard beads (for example, zirconia or glass beads) and a bead mill for agitating the beads at high speed.

The media-less dispersion method is generally suited for use in disintegrating the aggregated body of pigment and is also effective in minimizing a side reaction between a pigment and a dispersion medium. However, it is difficult, in the case of this media-less dispersion method, to make the pigment smaller than the primary particle size of pigment (i.e. the original particle size created on the occasion of manufacturing a pigment). On the other hand, in the case of the media dispersion method, although it is possible to obtain a pigment having a particle size which is smaller than the primary particle size, it will create an active pigment surface in the process of pulverizing the pigment, thus giving rise to the reaggregation of pigment particles and hence rendering the dispersion unstable. This tendency would become more prominent when a material which is high in reactivity is employed as a dispersion medium.

The pigment dispersion according to the embodiments of the present invention can be most preferably manufactured by using any one of the methods according to the embodiments of the present invention.

Namely, the method comprises:

subjecting a pigment to surface treatment to provide the pigment with a functional group to obtain a surface-modified pigment;

either coating the surface-modified pigment with a resin at a ratio of 5 to 37% by weight based on the weight of the surface-modified pigment and then dispersing the resin-coated pigment in a preliminary dispersion medium at a ratio ranging from 10% by weight to 41% by weight based on a total weight of the preliminary dispersion medium to obtain a dispersion precursor which is dispersed in the preliminary dispersion medium having a boiling point of 140° C. at 1 atm; or adding 10% to 41% by weight (based on the total weight of a preliminary dispersion medium) of the surface-modified pigment and 5 to 37% by weight (based on the surface-modified pigment) of the resin to the preliminary dispersion medium having a boiling point of 140° C. at 1 atm to obtain a dispersion precursor where the resin-coated pigment composed of the surface-modified pigment and the resin is dispersed in the preliminary dispersion medium;

adding a main dispersion medium having a viscosity of 30 mPa.s or less at a temperature of 25° C. and a boiling point of 150° C. or more at 1 atm to the dispersion precursor and mixing them to obtain a mixture; and subjecting the mixture to distillation at a temperature of 70° C. or less and under a reduced pressure to remove the preliminary dispersion medium to obtain the pigment dispersion where the resin-coated pigment is dispersed in the main dispersion medium.

It has been made possible, due to the employment of this method, to effectively suppress the increase of viscosity that may be caused by the reaction between a dispersion medium and a pigment.

The surface modification of pigment is performed for the purpose of enhancing the bonding between the pigment and the resin employed as a dispersing agent. For example, when carboxyl group or sulfonic acid group, both capable of strongly bonding with amino group which is a typical terminal of dispersing agent, is partially formed on the surface of pigment, the dispersibility of the pigment would be remarkably enhanced. The modification of the surface of pigment with the aforementioned functional group can be achieved by using a suitable oxidizing agent for oxidizing the surface of pigment crystal or by using the effect of a sulfonating agent. It is generally known that even if a sulfone-modifying compound (synergist) exhibiting a high physical adsorption to a pigment is adsorbed onto the surface of pigment, more or less the same degree of effect as described above would be achieved. However, the surface-modified pigment whose surface has been directly modified with a sulfonating agent is more excellent in bonding strength between a pigment and sulfonic acid group and far more excellent in dispersion stability as compared with the synergist, and hence this surface-modified pigment can be preferably employed in the present invention.

The ratio of modification with a functional group can be directly measured by a surface spectroanalysis such as EDX if the modifying element includes sulfur atoms or phosphorus. In this case, the content of the element to be employed should preferably be at least about 0.1% based on the surface composition of pigment. However, if this modification ratio become too high, the acidity of pigment would become too strong so that the reaction of the modifying element with a dispersion medium would generate, and aggregation as well as thickening may be accelerated. Therefore, the modification ratio should preferably be confined at most to about 30%. When the functional group to be introduced into the surface of pigment is constituted by carboxylic acid which cannot be easily identified by EDX, the modification ratio can be estimated from the surface area which can be determined by adsorption method for example and from the number of modifying group which can be estimated by titrimetric method.

The surface modified pigment thus obtained is then permitted to react with a resin or monomer to temporarily obtain capsulized pigment. Then, the capsulized pigment is dispersed in a preliminary dispersion medium or otherwise allowed to react with a resin or monomer in a predetermined preliminary dispersion medium, thus directly obtaining a dispersion precursor. This preliminary dispersion medium is selected from those having a boiling point of not more than 140° C. at 1 atm. Specific examples of this preliminary dispersion medium include, for example, acetone, methylethyl ketone, methylpropyl ketone, methyl(iso)butyl ketone, 3-pentanone, ethyl acetate, methyl acetate and butyl acetate. When the solubility parameter of the preliminary dispersion medium differs greatly from the solubility parameter of the main dispersion medium, a suitable quantity of dispersing agent changes, thus increasing the probability of generating the reaggregation of resin. Preferably, the preliminary dispersion medium should be selected from those having almost the same solubility parameter as that of the main dispersion medium, the difference being limited preferably to ±5 MPa$^{1/2}$ at most, more preferably to ±2 MPa$^{1/2}$ at most.

The mixing ratio of each of the components in the preparation of the capsulized pigment and the dispersion precursor give a great influence to the properties of the pigment dispersion to be obtained. If the dispersion medium is not employed at a suitable quantity in the dispersion of pigment, the active points of the surface of pigment would not be sufficiently covered by the resin, thus raising the probability of reaggregation among pigment particles in the process of dispersing the pigment in the main dispersion medium that will be subsequently followed. Therefore, the surface-modified pigment should be employed in such a quantity that will be confined within the range of 10 to 41% by weight based on a total weight of the dispersion medium. On the other hand, the resin is employed at ratio ranging from 5 to 37% by weight based on the pigment.

On the occasion of preparing the capsulized pigment and the dispersion precursor, the resin or monomer is allowed to bond with the functional group on the surface of pigment or allowed to polymerize using this functional group as an active point, thus creating a resin-coated pigment. On this occasion however, unless this coating of resin is performed while disintegrating the pigment by a suitable method, the size of this resin-coated pigment would not be sufficiently decreased. Namely, unless the aforementioned reactions are allowed to take place under the ultrasonic irradiation or in a high-speed jet stream or a bead mill, the size of the pigment particle would not be sufficiently decreased. By suitably selecting the conditions of process, the average particle diameter of the pigment in the resin-coated pigment can be controlled. The generation of the capsulized pigment as well as the particle size of pigment can be confirmed for example by observation using a transmission electron microscope (TEM) after finishing the coating and drying of the aforementioned dispersion. In the case of capsulized pigment, the presence of thin coated film on the surface of pigment particle can be confirmed. However, when the pigment is dispersed in a dispersion, the determination of particle diameter of capsulized pigment including the resin coating is very difficult. Therefore, in general, the movement of pigment such as dynamic light scattering is measured to calculate the size of pigment particle to determine the diameter of pigment particle. As described above, it is now possible to obtain the dispersion precursor where the resin-coated pigment is dispersed in a preliminary dispersion medium.

To this preliminary dispersion medium, a main dispersion medium meeting the aforementioned conditions with regard to viscosity and boiling point is added and stirred to obtain a mixed solution, after which the preliminary dispersion medium is removed through distillation. Although it would be impossible to definitely regulate the conditions for removing the preliminary dispersion medium because of fluctuations in heat capacity and quantity of heat to apply, it would be possible to remove the preliminary dispersion medium by heating it for 0.5 to 3.0 hours at a temperature ranging from the ordinary temperature to 70° C. and under a pressure ranging from the ordinary pressure to 30 mmHg, and then, for 0.5 to 3.0 hours under a pressure ranging from 30 to 0.5 mmHg.

It is now made possible, through the manufacture of a pigment dispersion by the aforementioned methods, to achieve an ideal dispersion state wherein not only the average particle diameter of the resin-coated pigment is made sufficiently fine, but also the reaggregation due to a side reaction between a highly reactive main dispersion medium and the pigment is suppressed to minimum.

In some case, even if the dispersion of pigment is performed under the aforementioned conditions, the aggregation of particles may be generated at a level which would not bring about any problem in the stability of dispersion. In this case, the aggregated particle has a particle diameter of 1.0 μm or more. If this aggregated particle exists, delivery error would be more likely to occur on the occasion of performing the delivery of ink-jet ink in particular. Therefore, it is desirable to remove this aggregated particle as much as possible. Although it is possible to remove the aggregated particle by various methods such as filtration, centrifugal separation, etc., it is more preferable to employ the centrifugal separation which can be executed conveniently and at low cost without substantially deteriorating the original concentration of pigment. As for the specific conditions for this centrifugal separation, although they may be altered depending on the kind of pigment, the kind of dispersing agent, the size of vessel, and the type of procedure (continuous or batch process), this centrifugal separation can be performed by applying a gravity ranging from 2500 G to 70000 G to the pigment dispersion for a time period ranging from 5 minutes to 3 hours, thus making it possible to remove the aggregated particle.

More precisely, the time for effecting the centrifugal separation can be approximately calculated by using Stokes equation represented by the following expression (A) employing the relationships among the size of centrifugal vessel, the viscosity of liquid, the density of particles and centrifugal gravity G.

Sedimentation velocity=[G×(density of pigment-density of dispersion medium)×particle size]/[18×(viscosity of dispersion medium)]    expression (A)

Thus, it is preferable, according to the expression (A), to apply to the pigment dispersion the time required for the 1 μm pigment particle to settle down along the height of centrifugal vessel. More specifically, the aggregated particle in the pigment dispersion should preferably be restricted as defined below. Namely, the number of the aggregated particle having a diameter of 1 μm or more per 1 mL should be limited to $1.6 \times 10^8$ or less. If the aggregated particle having a diameter of 1 μm or more is included in the pigment dispersion at a ratio exceeding the aforementioned range, delivery error would more likely to occur on the occasion of performing the delivery of ink-jet ink.

The pigment dispersion according to the embodiments of the present invention can be made into a UV curing type liquid ink precursor by adding, if required, other acid polymeric compounds or photo-acid generating agent. By the term "precursor", it is intended to mean a precursor of ink-jet ink which is not photo-sensitive by itself, and is not yet brought into a state where the viscosity thereof is about 30 mPa.s or less at the ordinary temperature which is requisite for the delivery of ink-jet ink. To this liquid ink precursor, chemicals for providing the ink with prescribed characteristics of physical properties, such as an acid polymeric compound, a sensitizing agent, a surfactant or a viscosity stabilizing agent are added to obtain a suitable liquid ink.

When this liquid ink is irradiated with light, an acid generates from the photo-acid generating agent, and then, this acid acts as a catalyst for the crosslinking reaction of the polymeric compound and at the same time, diffuses inside the ink layer. The diffusion of this acid as well as the crosslinking reaction using this acid as a catalyst can be accelerated by applying heat to the liquid ink. In different from the radical polymerization, this crosslinking reaction would not be obstructed by the presence of oxygen. As a result, a plurality of crosslinking reactions can be caused to occur using only one photon, thereby making it possible to realize a high sensitivity. Moreover, the crosslinking reaction can be permitted to take place quickly even in a deep portion of the ink layer and in the interior of the media. Therefore, as compared with the case of radical polymerization system, the ink layer to be obtained in this manner would become far more excellent in adhesion.

Accordingly, by the employment of this liquid ink, the ink layer can be rapidly non-fluidized by the application of light irradiation and heating after finishing the delivery of ink onto the surface of printing matter. Namely, it is possible to obtain a printed matter of high quality without necessitating a large scale exposure system. Moreover, in different from such a liquid ink utilizing radical polymerization, it is not required, in the case of this liquid ink, to employ a carcinogenic radical-generating agent or a radical polymeric monomer which is highly stimulating to skin and bad smelling.

Further, when the ratio of the polymeric compound in the liquid ink to the entire volume of solvent is, sufficiently high, there is little possibility of causing organic solvent to volatile on the occasion of printing. Therefore, it is now possible to obviate the problem of environmental contamination that may occur due to the evaporation of organic solvents, thus unnecessitating the provision of an exhaust installation or a solvent recovery mechanism. Because of these reasons, the ink layer can be rapidly non-fluidized, thereby making it possible to easily fix a printed image without substantially generating bleeding on the printing surface of various characteristics. Additionally, there is little possibility of the deterioration of printed surface which may otherwise occur due to the drying of the ink layer.

As for the photo-acid generating agent which are capable of generating acid as they are irradiated with light, they include onium salt, diazonium salt, quinone diazide compounds, organic halide compounds, aromatic sulfonate compounds, bisulfone compounds, sulfonyl compounds, sulfonate compounds, sulfonium compounds, sulfamide compounds, iodonium compounds, sulfonyl diazomethane compounds and mixtures of these compounds.

Specific examples of the aforementioned compounds include triphenylsulfonium triflate, diphenyliodonium triflate, 2,3,4,4-tetrahydroxybenzophenone-4-naphthoquinone diazide sulfonate, 4-N-phenylamino-2-methoxyphenyl diazonium sulfate, 4-N-phenylamino-2-methoxyphenyldiazonium-p-ethylphenyl sulfate, 4-N-phenylamino-2-methoxyphenyldiazonium-2-naphthyl sulfate, 4-N-phenylamino-2-methoxyphenyldiazonium-phenyl sulfate, 2,5-diethoxy-4-N-4'-methoxyphenylcarbonylphenyldiazonium-3-carboxy-4-hydroxyphenyl sulfate, 2-methoxy-4-N-phenylphenyldiazonium-3-carboxy-4-hydroxyphenyl sulfate, diphenylsulfonyl methane, diphenylsulfonyl diazomethane, diphenyl disulfone, α-methylbenzoin tosylate, pyrogallo trimesylate, benzoin tosylate, MPI-103 (CAS. NO. [87709-41-9]; Midori Kagaku Co., Ltd.), BDS-105 (CAS. NO. [145612-66-4]; Midori Kagaku Co., Ltd.), NDS-103 (CAS. NO. [110098-97-0]; Midori Kagaku Co., Ltd.), MDS-203 (CAS. NO. [127855-15-5]; Midori Kagaku Co., Ltd.), Pyrogallol tritosylate (CAS. NO. [20032-64-8]; Midori Kagaku Co., Ltd.), DTS-102 (CAS. NO. [75482-18-7]; Midori Kagaku Co., Ltd.), DTS-103 (CAS. NO. [71449-78-0]; Midori Kagaku Co., Ltd.), MDS-103 (CAS. NO. [127279-74-7]; Midori Kagaku Co., Ltd.), MDS-105 (CAS. NO.

[116808-67-4]; Midori Kagaku Co., Ltd.), MDS-205 (CAS. NO. [81416-37-7]; Midori Kagaku Co., Ltd.), BMS-105 (CAS. NO. [149934-68-9]; Midori Kagaku Co., Ltd.), TMS-105 (CAS. NO. [127820-38-6]; Midori Kagaku Co., Ltd.), NB-101 (CAS. NO. [20444-09-1]; Midori Kagaku Co., Ltd.), NB-201 (CAS. NO. [4450-68-4]; Midori Kagaku Co., Ltd.), DNB-101 (CAS. NO. [114719-51-6]; Midori Kagaku Co., Ltd.), DNB-102 (CAS. NO. [131509-55-2]; Midori Kagaku Co., Ltd.), DNB-103 (CAS. NO. [132898-35-2]; Midori Kagaku Co., Ltd.), DNB-104 (CAS. NO. [132898-36-3]; Midori Kagaku Co., Ltd.), DNB 105 (CAS. NO. [132898-37-4]; Midori Kagaku Co., Ltd.), DAM-101 (CAS. NO. [1886-74-4]; Midori Kagaku Co., Ltd.), DAM-102 (CAS. NO. [28343-24-0]; Midori Kagaku Co., Ltd.), DAM-103 (CAS. NO. [14159-45-6]; Midori Kagaku Co., Ltd.), DAM-104 (CAS. NO. [130290-80-1] and CAS. NO. (130290-82-3]; Midori Kagaku Co., Ltd.), DAM-201 (CAS. NO. [28322-50-1]; Midori Kagaku Co., Ltd.), CMS-105 (Midori Kagaku Co., Ltd.), DAM-301 (CAS. NO. [138529-81-4]; Midori Kagaku Co., Ltd.), SI-105 (CAS.NO.[34694-40-7]; Midori Kagaku Co., Ltd.), NDI-105 (CAS. NO. [133710-62-0]; Midori Kagaku Co., Ltd.); EPI-105 (CAS. NO. [135133-12-9]; Midori Kagaku Co., Ltd.); UVACURE1591(Daicel UCB Co., Ltd.); and ESACURE-1064 (Lamberty Co., Ltd.).

Among these compounds, preferable photo-acid generating agents are onium salts. Examples of onium salts useful in this case are diazonium salts, phosphonium salts and sulfonium salts having, as a counter ion, fluoroboric acid anion, hexafluoroantimonic acid anion, hexafluoroarsenic acid anion, trifluoromethane sulfonate anion, paratoluene sulfonate anion or paranitrotoluene sulfonate anion. In particular, it is preferable that the photo-acid generating agent comprises onium salts represented by the following general formulas (3) and (4). These photo-acid generating agents are advantageous in terms of both sensitivity and stability.

(3)

(4)

wherein R6, R7, R8, R9 and R10 individually represents either aromatic group or functional group having a chalcogenide atom and an aromatic group; C1 and C2 individually represents a chalcogenide atom; A4 and A5 individually represents anion species selected from the group consisting of $PF_6^-$, $SbF_6^-$, $BF_4^-$, $AsF_6^-$, $CF_3SO_3^-$, $C_4F_9SO_3^-$ and $CH_3SO_3^-$; and m and n individually represents an integer. Incidentally, the term "chalcogenide atom" means a chalcogen atom and other atoms which are more positive than the chalcogen atoms. Further, "chalcogen atom" means to include sulfur, selenium, tellurium, polonium and iodine atoms.

The onium salts represented by the aforementioned general formulas (3) and (4) are high in curing reactivity and excellent in stability at the ordinary temperature. Therefore, the onium salts are capable of suppressing the curing of the aforementioned liquid ink under the conditions where light is not irradiated thereto.

If the compounds represented by the aforementioned general formulas (3) and (4) are to be employed as a photo-acid generating agent, the aforementioned chalcogenide atom should preferably be selected from sulfur atom and iodine atom in view of securing the thermal stability of the photo-acid generating agent and the stability thereof to water. In this case, the anion species should preferably be formed of a non-organic acid, in particular, formed of $PF_6^-$ in view of securing suitable acidity and thermal stability. Further, it is especially preferable to employ hexafluorophosphate compounds having a phenylsulfonium skeleton in view of concurrently improving the photosensitivity of the photo-acid generating agent.

The photo-acid generating agent may further contain, if required, a sensitizing dye. Examples of such a sensitizing dye include acridine compounds, benzofuravins, perylene, anthracene and laser dyes.

Further, it is possible to suitably employ acid esters having photodissociating property as a photo-acid generating agent. Specific examples of such esters include orthonitrobenzyl ester of alumi silanol.

The mixing ratio of the photo-acid generating agent in the liquid ink may be suitably selected depending on the acid generating efficiency of the photo-acid generating agent as well as on the quantity of the color component. For example, when the concentration of the pigment in the liquid ink is about 5% by weight, the mixing ratio of the photo-acid generating agent may be confined generally within the range of 1 to 10 parts by weight per 100 parts by weight of a solvent which can be polymerized in the presence of the acid included in the liquid ink. If the mixing ratio of the photo-acid generating agent is less than 1 part by weight per 100 parts by weight of the solvent for the photo-acid generating agent, the sensitivity of the ink-jet recording ink would be deteriorated. On the other hand, if the mixing ratio of the photo-acid generating agent exceeds 10 parts by weight, the increase in viscosity with time of the ink would be intensified thereby degrading the coating properties of the ink and lowering the hardness of the ink film that has been photo-cured. Further, there is possibility that the piping or the head members of recording apparatus corrode. In view of this, the mixing ratio of the photo-acid generating agent should preferably be confined within the range of 2 to 8 parts by weight, more preferably 2 to 6 parts by weight. When the mixing ratio of the photo-acid generating agent can be confined within this more preferable range, it would be preferable in securing the storage stability of ink or in minimizing the corrosion of the piping and the head members.

Since the aforementioned liquid ink is a photosensitive ink which requires the application of heating, the volatility of ink should preferably be as low as possible in viewpoint of safety and odor. More specifically, the rate of volatilization of ink after the exposure thereof and at a temperature of 80° C. should preferably be confined to 0.2 mg/cm$^2$·min or less. The quantity of volatilization herein is a quantity of volatilization (mg) per minute that will be generated when a vessel having an opening area of 10 cm$^2$ for instance is heated. Although this quantity of volatilization varies depending on the size of the opening of the vessel, this value is usually defined as a value that can be obtained when a Petri dish having a diameter of 6 cm and containing 4 g of ink therein is heated under the ordinary pressure. When the ink is formed of a composition which is incapable of securing the aforementioned range, the rate of volatilization in the process of heating would become too large, thus obstructing the safety and making the odor more severe. On the other hand, the ink is formulated such that the volatility thereof is very poor, e.g. 0.00001 mg/cm$^2$·min or less, the viscosity of the ink would be increased in general so that there is much possibility that the delivery of ink-jet would become difficult.

As already explained, the liquid ink to be prepared from the pigment dispersion according to the embodiments of the present invention should preferably be formulated so as to have a fluidity of at least 30 mPa.s at the ordinary temperatures. In order to enable the ink to have the aforementioned properties, the viscosity nt represented by the following formula (B) should preferably be confined within the range of 3 (mPa.s) to 30 (mPa.s), more preferably 5 (mPa.s) to 25 (mPa.s), if "n" kinds of acid-polymerizable compounds are mixed together for inclusion in the ink as described above.

$$\eta_t = \exp(\chi_1 \cdot ln(\eta_1) + \chi_2 \cdot ln(\eta_2) + \chi_3 \cdot ln(\eta_3) + \ldots + \chi_n \cdot ln(\eta_n)) \quad (B)$$

(wherein $\chi_1, \chi_2, \chi_3 \ldots \chi_n$ represent weight ratios of each of the components; and $\eta_1, \eta_2, \eta_3 \ldots \eta_n$ represent the viscosity of the individual component at the ordinary temperature and the ordinary pressure)

If the viscosity $\eta_t$ is failed to fall within this range, the delivery of ink may become very difficult or disturbance of image may occur due to irregular delivery of ink.

The aforementioned ink can be cured by the irradiation of light to form an ink layer. Especially, when this liquid ink includes in its components a large number of alicyclic or aliphatic skeletons, the ink layer that has been cured is enabled to exhibit a sufficient plasticity and to resolve. Therefore, after the formation of ink layer through the delivery of the liquid ink onto the surface of an image carrier, this ink layer can be subsequently transferred onto a recording medium. Namely, after an ink layer is formed on an image carrier by delivering the liquid ink, the resultant ink layer is subjected to the irradiation of light and heating to cure the ink layer. Then, under the condition where this ink layer is contacted with a recording medium, a suitable degree of pressure with or without accompaniment of heating is applied onto this ink layer to refluidize or plasticize the ink layer, thus making it possible to transfer the ink layer onto a recording medium.

Further, when the liquid ink is directly delivered onto the surface of a recording medium, an ink layer thus formed on the surface of the recording medium is cured or pre-cured by the application of light irradiation or heating, after which the resultant ink layer is further subjected to heating to accomplish the main curing of the ink layer, thereby making it possible to fix the ink layer onto the recording medium.

The liquid ink-jet ink should desirably be high in stability in delivery of ink-jet. However, the dispersion as well as the liquid ink precursor according to the embodiments of the present invention are generally inclined to become high in the increase with time of viscosity so that the preferable properties of them can be retained only a short period of time if they are left as they are. Therefore, it is desirable that the dispersion and the liquid ink precursor additionally contain, as a viscosity stabilizing agent, a basic compound and/or a compound capable of expressing basicity. If carbon black is employed as a color component, the effects of these viscosity stabilizing agents can be exhibited more prominently. Moreover, since these basic compounds are concurrently capable of effectively protecting not only the interior of the ink-jet head of recording apparatus but also the metal portions of the piping for the ink from being eroded by acids, the employment of these basic compounds are preferable in any kinds of the liquid ink precursors according to the embodiments of the present invention.

As for the aforementioned basic compound, it is possible to employ any inorganic basic materials as well as organic basic materials which are capable of being dissolved in a solvent to be polymerized in the presence of an acid. However, in view of solubility, the employment of organic basic materials is more preferable. Specific examples of such organic basic materials include ammonia compound, ammonium compounds, substituted or unsubstituted alkylamine, substituted or unsubstituted aromatic amine, pyridine, pyrimidine, and organic amines having a hetrocyclic skeleton such as imidazole. More specific examples of such organic basic materials include n-hexyl amine, dodecyl amine, aniline, dimethyl aniline, diphenyl amine, triphenyl amine, diazabicyclooctane, diazabicycloundecane, 3-phenyl pyridine, 4-phenyl pyridine, lutidine, 2,6-di-t-butylpyridine, and sulfonyl hydrazides such as 4-methylbenzene sulfonyl hydrazide, 4,4'-oxybis(benzenesulfonyl hydrazide) and 1,3-benzenesulfonyl hydrazide.

Ammonium compounds can be also employed as a basic compound. Preferable examples of the ammonium compounds are quaternary ammonium salts. For example, various substituent groups such as methyl, ethyl, propyl, isopropyl, butyl, dodecyl, phenyl and benzyl can be preferably employed as a substituent group for an ammonium atom, and various anions such as hydroxyl ion, $^-OR$ (R is alkyl having 1 to 4 carbon atoms), $^-OCOR'$ (R' is alkyl, aryl or alkylaryl), $OCOO^-$ and $OSOO^-$ can be preferably employed as a counter ion. Especially preferable examples of the basic compound are tetramethyl ammonium hydroxide and ammonium salt of tetrabutyl hydroxide. These basic compounds can be employed singly or in combination of two or more.

However, if a basic compound which is very strong in basicity such as imidazole is employed in this case, polymerization with time may occur or otherwise, a side reaction such as decomposition of photo-acid generating agent may be likely to take place. On the other hand, if a basic compound which is very weak in basicity is employed in this case, it would become difficult to sufficiently secure the effect of stabilizing the viscosity of ink through the addition of the basic compound. For example, it is preferable to employ basic compounds exhibiting a base dissociation constant pKb of 4 or more at a temperature of 25° C. and in a state of suitable aqueous solution thereof. However, if the pKb of the basic compounds is higher than 11, such compounds would be incapable of exhibiting the effect of stabilizing the viscosity of ink. Examples of basic compounds which are capable of satisfying the aforementioned conditions are pyridine derivatives, aniline derivatives, aminonaphthalene derivatives, other nitrogen-containing heterocyclic compounds and the derivatives thereof.

Specific examples of the pyridine derivatives include 2-fluoropyridine, 3-fluoropyridine, 2-chloropyridine, 3-chloropyridine, 3-phenylpyridine, 2-benzylpyridine, 2-formylpyridine, 2-(2'-pyridyl) pyridine, 3-acetylpyridine, 2-bromopyridine, 3-bromopyridine, 2-iodopyridine, 3-iodopyridine, and 2,6-di-tert-butylpyridine.

Specific examples of the aniline derivatives include aniline, 4-(p-aminobenzoyl) aniline, 4-benzylaniline, 4-chloro-N,N-dimethylaniline, 3-5-dibromoaniline, 2,4-dichloroaniline, N,N-dimethylaniline, N,N-dimethyl-3-nitroaniline, N-ethylaniline, 2-fluoroaniline, 3-fluoroaniline, 4-fluoroaniline, 2-iodoaniline, N-methylaniline, 4-methylthioaniline, 2-bromoaniline, 3-bromoaniline, 4-bromoaniline, 4-bromo-N,N-dimethylaniline, 2-chloroaniline, 3-chloroaniline, 4-chloroaniline, 3-chloro-N,N-dimethylaniniline, 3-nitroaniline, 4-nitroaniline, 2-methoxyaniline, 3-methoxyaniline, diphenylamine, 2-biphenylamine, o-toluidine, m-toluidine, p-toluidine, 3,3'-diaminodiphenyl sulfone, 4,4'-diaminodiphenyl sulfone, and 4,4'-bis(4-aminophenoxy) diphenyl sulfone.

Specific examples of the aminonaphthalene derivatives include, for example, 1-amino-6-hydroxynaphthalene, 1-naphthylamine, 2-naphthylamine, diethylaminonaphthalene, and N-methyl-1-naphthylamine.

Specific examples of other nitrogen-containing heterocyclic compounds and the derivatives thereof include, for example, cinnoline, 3-acetylpiperidine, pyrazine, 2-methylpyraxzine, methylaminopyrazine, pyridazine, 2-aminopyrimidine, 2-amino-4,6-dimethylpyrimidine, 2-amino-5-nitropyrimidine, 2,4,6-triamino-1,3,5-triazine, pyrrol, pyrazole, 1-methylpyrazole, 1,2,4-triazole, indazole, benzotriazole, quinazoline, quinoline, 3-aminoquinoline, 3-bromoquinoline, 8-carboxyquinoline, 3-hydroxyquinoline, 6-methoxyquinoline, 5-methylquinoline, quinoxaline, thiazole, 2-aminothiazole, 3,4-diazaindole, purine, 8-azapurine, indole and indolizine.

Among them, the employment of aniline derivatives as the aforementioned basic compound is especially preferable in terms of viscosity stability, volatility, basicity and low side-reaction.

However, since the aforementioned aniline compounds are relatively low basicity, the employment thereof in combination with a monomer having oxetane group and exhibiting basicity per se is not preferable in general. The oxetane compound should preferable be selected from those exhibiting such a high basicity that the pKb thereof at 25° C. is confined within the range of 3 to 7. For example, basic compounds such as amine having an aliphatic skeleton or amine having an alicyclic skeleton can be suitably employed.

When the aforementioned basic compounds are capable of forming a salt with an anion as represented by the following general formula (5) and if the acidity of the anion is relatively low, the basic compounds will be enabled to exhibit a weak basicity, and therefore the basic compounds can be employed likewise.

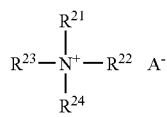

(5)

wherein $A^-$ is a compound having a sulfonate anion or a carboxyl anion; and $R^{21}$, $R^{22}$, $R^{23}$ and $R^{24}$ may be the same or different and are individually a substituted or unsubstituted aromatic group, hydrogen atom, hydroxyl group, or a substituted or unsubstituted alkyl group.

Since the main ink may be sometimes heated subsequent to the exposure thereof, these basic compounds should preferably be as low as possible in volatility. More specifically, the boiling point of these basic compounds should preferably be 150° C. or more, more preferably 180° C. or more.

The basic compound or the compound capable of expressing basicity in the liquid ink or a precursor thereof containing a pigment dispersion should preferably be included in the liquid ink or in the precursor thereof at a ratio ranging from 1 mol % to 30 mol %, more preferably from 2 mol % to 15 mol % based on a total molar quantity of the photo-acid generating agent. If the content of the basic compound or of the compound capable of expressing basicity falls outside this range, the sensitivity of the ink or the precursor would be remarkably deteriorated or the effect of stabilizing the viscosity of the ink or the precursor would be lost.

The employment of a photo-sensitive basic compound that can be decomposed by the irradiation of light or radiation would be preferable since the deterioration of sensitivity due to the addition of a basic material can be minimized.

As for the photo-sensitive basic compound, it is possible to preferably employ sulfonium compounds and iodonium compounds. As for the sulfonium compounds, the compounds represented by the following general formulas (SS1) to (SS4) can be exemplified.

(SS1)

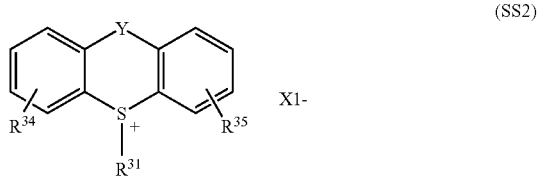

(SS2)

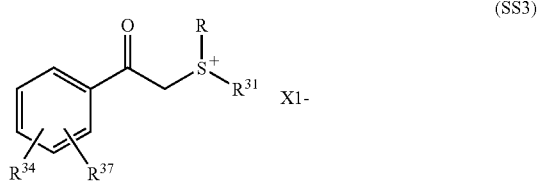

(SS3)

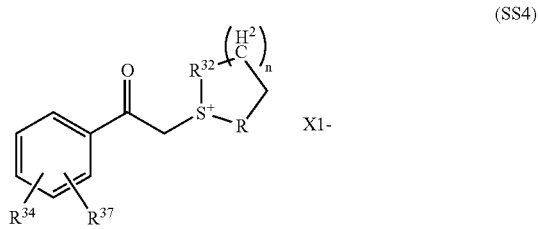

(SS4)

wherein $R^{31}$, $R^{32}$ and $R^{33}$ may be the same or different and are individually an alkyl group, aryl group, heteroaryl group, heteroalkyl group, alkylaryl group, halogen atom, alkoxy group, phenoxy group, thiophenol group, phenylsulfonyl-substituted aryl group or phenylsulfenyl-substituted aryl group; Y is $CH_2$, O or S; $R^{34}$, $R^{35}$, $R^{36}$ and $R^{37}$ may be the same or different and are individually an alkyl group, alkoxy group or halogen atom; and $X1^-$ represents a basic anion.

Preferable examples of $R^{31}$, $R^{32}$ and $R^{33}$ include methyl, ethyl, propyl, isopropyl, butyl, phenyl, biphenyl, tolyl, xylyl, chlorophenyl, bromophenyl, methoxyphenyl, ethoxyphenyl, propyloxyphenyl, butyloxyphenyl, tert-butyloxyphenyl, phenoxyphenyl, thiophenoxyphenyl, phenoxyphenyl, thiophenoxyphenyl and phenylsulfonylphenyl.

Preferable examples of $R^{34}$, $R^{35}$, $R^{36}$ and $R^{37}$ include an alkyl group, methoxy group, ethoxy group, chlorine atom and bromine atom.

Specific examples of $X1^-$ include anions such as a hydroxyl ion, $^-OR$ (R is an alkyl having 1 to 4 carbon atoms), $^-OCOR'$ (R' is an alkyl, aryl or alkylaryl), $OCOO^-$ and $OSOO^-$.

As for the iodonium compounds, the compounds represented by the following general formulas (IS1) to (IS3) can be exemplified.

(IS1)

-continued

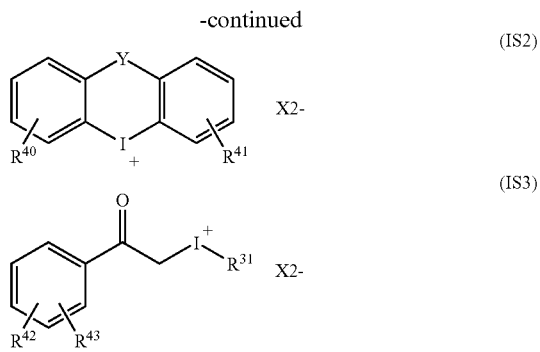

(IS2)

(IS3)

wherein $R^{38}$ and $R^{39}$ may be the same or different and are individually an alkyl group, aryl group, heteroaryl group, heteroalkyl group, alkylaryl group, halogen atom, alkoxy group, phenoxy group, thiophenol group, phenylsulfonyl-mono, di or tri-substituted aryl group or phenylsulfenyl-mono, di or tri-substituted aryl group; Y is $CH_2$, O or S; $R^{40}$, $R^{41}$, $R^{42}$ and $R^{43}$ may be the same or different and are individually an alkyl group, alkoxy group or halogen atom; and $X2^-$ represents a basic anion.

Preferable examples of $R^{38}$ and $R^{39}$ include methyl, ethyl, propyl, isopropyl, butyl, phenyl, biphenyl, tolyl, xylyl, chlorophenyl, bromophenyl, methoxyphenyl, ethoxyphenyl, propyloxyphenyl, butyloxyphenyl, tert-butyloxyphenyl, phenoxyphenyl, thiophenoxyphenyl, phenoxyphenyl, thiophenoxyphenyl and phenylsulfonylphenyl.

Preferable examples of $R^{40}$, $R^{41}$, $R^{42}$ and $R^{43}$ include an alkyl group, methoxy group, ethoxy group, chlorine atom and bromine atom.

Specific examples of $X2^-$ include anions such as a hydroxyl ion, $^-OR$ (R is an alkyl having 1 to 4 carbon atoms), $^-OCOR'$ (R' is an alkyl, aryl or alkylaryl), $OCOO^-$ and $OSOO^-$.

Especially preferable examples of such sulfonium compounds and iodonium compounds are triphenylsulfonium acetate, triphenyl sulfonium hydroxide, triphenyl sulfonium phenolate, tris-(4-methylphenyl) sulfonium hydroxide, tris-(4-methylphenyl) sulfonium acetate, tris-(4-methylphenyl) sulfonium phenolate, diphenyl iodonium hydroxide, diphenyl iodonium acetate, diphenyl iodonium phenolate, bis-(4-t-butylphenyl) iodonium hydroxide, bis-(4-t-butylphenyl) iodonium acetate, bis-(4-t-butylphenyl) iodonium phenolate, thiophenyl-substituted triphenylsulfonium acetate, and thiophenyl-substituted triphenylsulfonium hydroxide.

In addition to the aforementioned basic compounds, it is also possible to incorporate other basic compounds into the ink. Further, if onium salts are to be employed as a photo-acid generating agent, the photo-acid generating agent should preferably be selected from those which are similar in kinds to the basic compound. For example, if the photo-acid generating agent and the basic compound are both formed of sulfonium compounds or iodonium compounds, it would be possible to obtain excellent effects in terms of sensitivity and shelf life stability.

Alternatively, it is also possible to preferably employ a compound which is not inherently basic but is capable of generating a basic compound through the decomposition thereof with time, since the basic compound thus generated can act to neutralize acids that may gradually generate. Specific examples of such a compound include NBC-101 (trade name; Midori Kagaku Co., Ltd.), carbamate compounds such as α,α-dimethyl-3,5-dimethoxybenzyl carbamate.

The pigment dispersions as well as the liquid ink precursors according to the embodiments of the present invention can be obtained in a suitable dispersion state by using a capsulized pigment itself. However, in order to further enhance the dispersibility of pigment, a small quantity of ordinary dispersing agents such as a nonionic or ionic surfactant and an antistatic agent can be incorporated in the pigment dispersions as well as in the liquid ink precursors. High-molecular dispersing agents having almost the same properties as the aforementioned dispersing agents, such as acrylic polymer and polyvinyl alcohol, can be also suitably employed. However, when a cationic dispersing agent is employed as a dispersing agent, it is preferable to select a compound whose acidity is lower than that of carboxylic acid. The reason is that some kinds of cationic dispersing agents may promote the curing dark reaction of the ink. Further, those kinds of dispersing agents and dyes that exhibit strong basicity are undesirable as they not only degrade the sensitivity of ink but also promote the curing dark reaction occasionally. Therefore, the dispersing agents should preferably be selected from those exhibiting nearly neutrality or from nonionic dispersing agents.

In the preparation of the liquid ink according to the embodiments of the present invention, it should preferably be prepared so as not to contain any volatile component such as water and organic solvents. However, organic solvents which are relatively safe such as methylethyl ketone, propylene glycol-based solvents and ethyl lactate may be contained therein in a very little quantity for the purpose of preventing the precipitation with time of the aforementioned photo-acid generating agents. In particular, the inclusion of not more than 5% (based on an entire volume of dispersion medium) of ketone-based organic solvent such as methylethyl ketone is desirable in viewpoint of enhancing the dispersion stability of ink.

Further, if the ink-jet recording apparatus is provided with a gas exhausting mechanism or a solvent recovery mechanism for instance, a relative large quantity of organic solvents may be contained in the solution for the purpose of obtaining desired printed matters. In this case, it is preferable, in safety viewpoint, to employ water, alcohols such as ethanol and propanol, or petroleum components such as isoper and terpene.

As already explained above, the liquid ink to be prepared from the pigment dispersions according to the embodiments of the present invention depends largely on the chemical amplification mechanism. Namely, an acid generates from a photo-acid generating agent due to the exposure thereof, and the acid thus generated is diffused due to the heating thereof, thus enabling the acid to function as a catalyst for the crosslinking reaction or polymerization reaction. Therefore, in the case of this liquid ink, the presence of basic ions in a great magnitude would become a cause for deteriorating the sensitivity of the ink. Therefore, attention should be paid so that the liquid ink can be prevented from being contaminated by a large quantity of basic ions not only in the process of preparing the liquid ink but also even in the process of manufacturing each of the constituent components.

Since pigment is dispersed in a form of specific resin-coated pigment by using a specific dispersion medium, the pigment dispersion according to the embodiments of the present invention can be made appropriate in viscosity and excellent in dispersion stability. The ink for UV-curing type ink-jet recording that can be prepared by using such a pigment dispersion is minimal in changes of viscosity and excellent in stability of components, thus obviating the problem of dispersion deterioration. Therefore, then this ink is used in the ink-jet recording, the printing can be performed without generating any delivery error of ink, thereby making it possible to obtain printed matters which are excellent in quality and hence free from missing of images.

Next, the method of ink-jet recording according one embodiment of the present invention will be explained with reference to FIG. 1.

FIG. 1 is a schematic view of a typical ink-jet recording apparatus employed for performing the ink-jet recording by the method according to one embodiment of the present invention. The ink-jet recording apparatus 1 shown in FIG. 1 is provided with a transferring mechanism 3 for transferring a recording medium 2. Along the running direction of the transferring mechanism 3, there are successively disposed, starting from the upstream side to the downstream side, an ink-jet type recording head 4, a light source 5 and a heater as a heating mechanism 6.

With respect to the recording medium (or an article to which printing is applied) 2, there is not any particular limitation on the kinds thereof as long as printing can be performed on the recording medium 2. Namely, it is possible to employ, as the recording medium 2, various materials including paper, an OHP sheet, a resin film, non-woven fabric, a porous film, a plastic plate, a circuit board and a metallic substrate.

The transferring mechanism 3 is constructed so as to enable the recording medium 2 to pass through the recording head 4, the light source 5 and the front side of heater 6. In this case, the transferring mechanism 3 is designed such that the recording medium 2 can be transferred from the right side to the left side in the drawing. This transferring mechanism 3 can be constituted for example by a belt and/or a roller for transferring the recording medium 2, and a driving mechanism for driving the belt and/or the roller. Further, this transferring mechanism 3 may be further provided with a guiding member for assisting the transfer of the recording medium 2.

The recording head 4 is so as to deliver a liquid ink onto the surface of the recording medium 2 according to image signals, thereby forming an ink layer. As for the recording head 4, it is possible to employ a serial scanning type head mounted on a carriage or a line scanning type head having a width larger than that of the recording head 4. From the viewpoint of achieving high-speed printing, the latter is generally more advantageous as compared with the former. With respect to the method of delivering a liquid ink from the recording head 4, there is not particular limitation. For example, by using the pressure of vapor to be generated by the heat of a heating element, the droplets of ink can be ejected. Alternatively, by using a mechanical pressure pulse to be generated from a piezoelectric element, the droplets of ink can be ejected.

The light source 5 irradiates light to the ink layer formed on the surface of the recording medium 2, thus enabling acid to generate from the ink layer. As for the light source 5, it is possible to employ a mercury lamp such as a low, medium or high pressure mercury lamp; a tungsten lamp; an arc lamp; an excimer lamp; an excimer laser, a semiconductor laser; a YAG laser; a laser system constituted by a combination of laser and non-linear optical crystal; a high-frequency induction ultraviolet generating apparatus; an electron beam irradiating apparatus; an X-ray irradiating apparatus; etc. Among them, the employment of the high-frequency induction ultraviolet generating apparatus and the high/low pressure mercury lamp or the semiconductor laser would be more preferable, since these devices are advantageous in simplifying the system involved. The light source 5 may be provided with a converging mirror or a sweeping optical system.

The heater 6 employed as a heating mechanism heat the ink layer formed on the recording medium 2, thus promoting the crosslinking reaction using an acid as a catalyst. As for this heater 6, it is possible to employ an infrared lamp; a roller (heat roller) housing therein a heating element; a blower for ejecting hot air or heated air; etc.

By using the aforementioned apparatus 1, the printing to the recording medium can be performed by the following method.

First of all, by the transferring mechanism 3, the recording medium 2 is transferred from the right side to the left side in the drawing. The transferring speed of the recording medium 2 may be confined for example within the range of 0.1 m/min to 100 m/min.

As the recording medium 2 is transferred up to a location in front of the recording head 4, the aforementioned liquid ink is delivered from the recording head 4 according to the image signals. As a result, a prescribed ink layer (not shown) is formed on the recording medium 2.

Then, the recording medium 2 having the ink layer formed thereon is transferred to a location in front of the light source 5. At the moment when the recording medium 2 passes through a location in front of the light source 5, light is irradiated from the light source 5 to the ink layer formed on the recording medium 2, thereby an acid generates in the ink layer. Incidentally, the intensity of irradiated beam at the surface of ink layer may be confined generally within the range of several $mW/cm^2$ to 1 $KW/cm^2$ though this range may be varied depending on the wavelength of the light source to be employed. The quantity of exposure to the ink layer can be optionally determined depending on the sensitivity of liquid ink or on the transferring speed of the printing matter (i.e., the transferring speed of the recording medium 2).

Thereafter, the recording medium 2 is transferred to the interior of or in the vicinity of the heater 6. At the moment when the recording medium 2 passes through the interior of or in the vicinity of the heater 6, the ink layer formed on the recording medium 2 is heated by the heater 6 to promote the crosslinking reaction in the ink layer. Incidentally, in the apparatus shown in FIG. 1, the heating time by the heater 6 is generally relatively short, i.e. ranging from several seconds to several tens seconds. Accordingly, if it is desired that the curing of the ink layer is substantially completely accomplished by the heater 6, the heating should be performed with the maximum ultimate temperature being controlled to become relatively high, i.e., 200° C. or less, more preferably within the range of 80° C. to 200° C., most preferably within the range of about 60° C. to 180° C.

Subsequently, the recording medium 2 is transferred to the interior of stocker (or vessel) (not shown), thus finishing the printing.

The heating mechanism for heating the ink layer may not be restricted to the heater 6 which is disposed at a downstream side of the light source as shown in FIG. 1. For example, the light source 5 may be utilized as a heating source by moving the light source 5 close to recording medium 2 on the occasion of irradiating light to the ink layer while taking care so as not to damage the printing surface. Likewise, it is also possible to utilize the light source as a heating source by omitting the provision of a heat-dissipating mechanism such as a cold mirror. When a high-output bulb of several hundreds watts is employed as a light source, a cooling mechanism which must be provided together with the light source can be modified so as to intentionally return the waste heat to the surface of printing paper. More specifically, part of the waste heat mechanism of the cooling mechanism is modified so as to provide a mechanism which makes it possible to return the waste heat to the printing paper as described above. By the provision of such a mechanism, the ink layer can be heated by using heat to be generated from the light source.

For example, by reintroducing an air flow which has been utilized for cooling the light source onto the surface of printing paper or into the interior of transferring/sustaining mechanism, it will be possible to obtain a mechanism which corresponds to a light source having an output of not less than one hundred watts and provided with a heating mechanism. The ultimate temperature of the recording medium that can be realized through the recirculation of heat of the light source may be such that makes it possible to obtain the same degree of effect as obtainable from the heating by the aforementioned heater. Although it depends on the heating time, a preferable range of temperature may be generally at least 60° C., more preferably within the range of 80° C. to 100° C. When the speed of exposure is relatively high, e.g., several meters/sec., the ultimate temperature may be as high as 180° C. or so since the recording medium will be heated instantaneously.

When a light source which is capable of generating infrared ray in addition to the visible light is employed as the light source 5 for instance, the irradiation of light and the heating to the recording medium can be concurrently performed. The employment of such a light source is preferable since it will promote the curing of ink layer.

Since the ink layer is heated also from the heat to be generated from the light source 5 as the ink layer is irradiated with light, the heating mechanism may not necessarily be installed as an independent member as in the case of the heater 6. However, if only the heat from the light source 5 is utilized for heating the ink layer and then the heated ink layer is left to stand at the ordinary temperature for completely curing the ink layer, it will take a long time. Therefore, the standing of ink layer at the ordinary temperature should preferably be applied to only on the occasions where sufficiently a long period of time can be secured for complete curing of the ink layer. For example, in the case of the printed matters such as newspaper which will be distributed next day, it is possible to secure such a long time as about a whole day and night for curing the ink layer, and therefore it is possible to completely cure the ink layer even if the ink layer is left to stand at the ordinary temperature.

The images to be obtained by using the aforementioned recording method and ink would be excellent not only in quality of printing but also in curing property, thus making them excellent in three respects, i.e., hardness, adhesion and sun-proof.

Next, embodiments of the present invention will be explained in detail by referring to the following specific examples.

EXAMPLE I

Manufacture of Surface-modified Pigments

Various pigments were surface-treated to allow a sulfonic group to bond thereto to manufacture sulfonated pigments.

EXAMPLE I-1

A mixed solution comprising 100 g of carbon black, and 0.1 mol of vanadium acetylacetonate [V(acac)3] was stirred in chloroform for 4 hours at a temperature of 60° C. while treating the mixture with an ultrasonic dispersion head of 24 KHz and 300 W in an atmosphere comprising sulfur dioxide ($SO_2$) (0.5 atm=50.5 kPa) and oxygen (0.5 atm=50.5 kPa). The reaction solution was then washed with water and then, chloroform was fractionated.

By removing chloroform under a reduced pressure, surface-modified carbon black (I-K) was obtained and dried under a reduced pressure. By EDX elemental analysis, the sulfonic acid-modification ratio was identified and estimated as being 1.4% of the entire surface of carbon black. A broad absorption was appeared in the vicinity of 3200 $cm^{-1}$ of IR absorption, and at the same time, indications of the generation of a hydroxyl group was recognized on the surface of the carbon black.

When the aforementioned procedures were applied to several kinds of carbon black (CB) available in the market, the manufacture of carbon black modified with a sulfonic acid group in the same manner as described above was recognized in each sample.

EXAMPLE I-2

A surface-modified yellow pigment (I-Y) was obtained by repeating the same procedures as described in the aforementioned Example I-1 except that Pigment Yellow 180 was substituted for carbon black. By EDX elemental analysis, the sulfonic acid-modification ratio was identified and estimated as being 0.9% of the entire surface of the yellow pigment, and at the same time, indications of the generation of a hydroxyl group was recognized on the surface of the yellow pigment.

When the aforementioned procedures were applied to several kinds of benzimidazolone pigment available in the market, the manufacture of the yellow pigment modified with a sulfonic acid group in the same manner as described above was recognized in each sample.

EXAMPLE I-3

A surface-modified magenta pigment (I-M) was obtained by repeating the same procedures as described in the aforementioned Example I-1 except that Pigment Red 122 was substituted for carbon black. By EDX elemental analysis, the sulfonic acid-modification ratio was identified and estimated as being 1.2% of the entire surface of the magenta pigment, and at the same time, indications of the generation of a hydroxyl group was recognized on the surface of the magenta pigment.

When the aforementioned procedures were applied to several kinds of quinacridone pigment available in the market, the manufacture of the magenta pigment modified with a sulfonic acid group in the same manner as described above was recognized in each sample.

EXAMPLE I-4

A surface-modified cyan pigment (I-C) was obtained by repeating the same procedures as described in the aforementioned Example I-1 except that Pigment Blue 15:3 was substituted for carbon black. By EDX elemental analysis, the sulfonic acid-modification ratio was identified and estimated as being 1.8% of the entire surface of the cyan pigment, and at the same time, indications of the generation of a hydroxyl group was recognized on the surface of the cyan pigment.

When the aforementioned procedures were applied to several kinds of phthalocyanine pigment available in the market, the manufacture of the cyan pigment modified with a sulfonic acid group in the same manner as described above was recognized in each sample.

By using the surface-modified pigment thus obtained, a pigment dispersion where capsulized pigment was dispersed was prepared by the following procedures.

EXAMPLE II

Manufacture of Pigment Dispersion 60 g of the surface-modified carbon black which was manufactured in Example I-1 was added to 1500 g of pure water and stirred to obtain a slurry. Then, to this slurry, 60 g of toluene having epoxy resin (Epolead available from Daicel Chemical Industries Ltd.) dissolved therein was added little by little and stirred. Since the carbon black which was dispersed in water was permitted to gradually shift to toluene side, the carbon black was separated by filtration and dried in vacuum. Subsequently, by ozone treatment, the surface of the carbon black was subjected to a reaggregation-preventing treatment, thus obtaining capsulized black pigment (II-K). When this black pigment was observed by a transmission electron microscope (TEM), it was possible to confirm the formation of a capsule-like film of epoxy resin on the surface of the pigment.

Further, the same procedures as described above were repeated except that the surface-modified carbon black was replaced by the surface-modified yellow pigment (I-Y), the surface-modified magenta pigment (I-M) or the surface-modified cyan pigment (I-C). As a result, it was possible to obtain a capsulized yellow pigment (II-Y), a capsulized magenta pigment (II-M) and a capsulized cyan pigment (II-C).

Next, by changing the quantity of epoxy resin to be employed, various pigments were prepared. Further, by using zirconia bead 0.3 mm in diameter and a bead mill, each of the pigments was re-dispersed in methylethyl ketone (MEK) employed as a pre-dispersion medium to obtain a dispersion precursor, respectively. To each of these dispersion precursors, an equivalent quantity of limonene diepoxide (Celloxide 3000 available from Daicel Chemical Industries Ltd.) was added as main dispersing agent. The resultant mixture was stirred for one hour and then heated one hour with stirring at a temperature of 50° C. and a pressure of 50 mmHg, which was followed by a 3-hour heating at a pressure of 5 mmHg to remove MEK. In this manner, various pigment dispersions as shown in the following Table 1 were manufactured. In each of the pigment dispersions obtained in this example, the capsulized pigment was dispersed in limonene diepoxide employed as a dispersing agent.

Furthermore, untreated carbon black was directly dispersed in limonene diepoxide to prepare a dispersion of Comparative Example 1 as shown in the following Table 1.

TABLE 1

| Symbols of pigments | Kinds of pigments | Ratio of pigments (%) | Ratio of resin (%) | Dispersion medium | Remarks |
|---|---|---|---|---|---|
| II-K(5) | CB | 27 | 5 | C3000 | Dispersion stability bad |
| II-K(10) | CB | 27 | 10 | C3000 | |
| II-K(20) | CB | 27 | 20 | C3000 | |
| II-K(30) | CB | 27 | 30 | C3000 | |
| II-K(35) | CB | 27 | 35 | C3000 | Viscosity high |
| II-K(A) | CB | 1 | 30 | C3000 | Poor in concentration of color |
| II-K(B) | CB | 3 | 30 | C3000 | Require a little more concentration of color |
| II-K(C) | CB | 10 | 30 | C3000 | |
| II-K(D) | CB | 30 | 30 | C3000 | |
| II-K(E) | CB | 35 | 30 | C3000 | Partial precipitation observed |
| II-Y(10) | P.Y.180 | 27 | 10 | C3000 | Dispersion stability bad |
| II-Y(15) | P.Y.180 | 27 | 15 | C3000 | |
| II-Y(30) | P.Y.180 | 27 | 30 | C3000 | |
| II-Y(40) | P.Y.180 | 27 | 40 | C3000 | Viscosity slightly high |
| II-Y(45) | P.Y.180 | 27 | 45 | C3000 | Viscosity high |
| II-C(5) | P.B.15:3 | 27 | 5 | C3000 | Dispersion stability bad |
| II-C(10) | P.B.15:3 | 27 | 10 | C3000 | |
| II-C(20) | P.B.15:3 | 27 | 20 | C3000 | |
| II-C(30) | P.B.15:3 | 27 | 30 | C3000 | |
| II-C(35) | P.B.15:3 | 27 | 35 | C3000 | Viscosity high |
| II-C(A) | P.B.15:3 | 1 | 30 | C3000 | Poor in concentration of color |
| II-C(B) | P.B.15:3 | 3 | 30 | C3000 | Require a little more concentration of color |
| II-C(C) | P.B.15:3 | 10 | 30 | C3000 | |
| II-C(D) | P.B.15:3 | 30 | 30 | C3000 | |
| II-C(E) | P.B.15:3 | 35 | 30 | C3000 | Partial precipitation observed |
| II-M(15) | P.R.122 | 27 | 15 | C3000 | Dispersion stability bad |
| II-M(20) | P.R.122 | 27 | 20 | C3000 | |
| II-M(30) | P.R.122 | 27 | 30 | C3000 | |
| II-M(40) | P.R.122 | 27 | 40 | C3000 | Viscosity slightly high |
| II-M(45) | P.R.122 | 27 | 45 | C3000 | Viscosity high |
| Comp. Ex. 1 | CB | 27 | 30 | C3000 | Viscosity very high |

*The content (%) of pigment is based on a total weight of dispersion medium, and the content (%) of resin is based on the weight of pigment.

EXAMPLE III

Manufacture of Pigment Dispersion

To the surface-modified carbon black which was manufactured in Example I-1 was added a small quantity of ammonia and heated to modify part of the sulfone group. Then, 15 g of this modified pigment, a 50% solution of a 1:1 mixture comprising acryl-styrene copolymer resin having an acid number of 100 and a number average molecular weight of 12500, and MPK (methylpropyl ketone) as a pre-dispersion medium were mixed together and micro-capsulized while dispersing the mixture by using zirconia bead and a bead mill.

To the resultant reaction liquid thus obtained, 1 g of dimethylaminoethanol was added to generate a hydrophilic group on the surface of the capsule. Then, a silane coupling agent was added to the reaction liquid to insolubilize the capsule. Subsequently, the resultant liquid was subjected to reflux aging to obtain an MPK solution (dispersion precursor) of microcapsulized pigment (III-K). This dispersion precursor was then dried and observed by a transmission electron microscope (TEM), confirming the formation of a capsule-like film mainly consisted of acryl-styrene copolymer and melamine resin on the surface of the pigment.

Further, the same procedures as described in Example I-1 were repeated except that the surface-modified carbon black was replaced by the surface-modified yellow pigment (I-Y), the surface-modified magenta pigment (I-M) or the surface-modified cyan pigment (I-C). As a result, it was possible to obtain an MPK solution (dispersion precursor) of a capsulized yellow pigment (III-Y), a capsulized magenta pigment (III-M) and a capsulized cyan pigment (III-C), respectively.

Next, by changing the quantity of the resin to be employed, various dispersion precursors were prepared. To each of these dispersion precursors, an equivalent quantity of cyclohexane-1,4-divinyl ether (CHDV) was added as main dispersing agent. The resultant mixture was stirred for one hour and then heated one hour with stirring at a temperature of 50° C. and a pressure of 50 mmHg, which was followed by a 3-hour heating at a pressure of 5 mmHg to remove MEK. In this manner, various pigment dispersions as shown in the following Table 2 were manufactured. In each of the pigment dispersions obtained in this example, the capsulized pigment was dispersed in cyclohexane-1,4-divinyl ether (CHDV) employed as a dispersing agent.

Furthermore, untreated carbon black was directly dispersed in cyclohexane-1,4-divinyl ether to prepare a dispersion of Comparative Example 2 as shown in the following Table 2.

TABLE 2

| Symbols of pigments | Kinds of pigments | Ratio of pigments (%) | Ratio of resin (%) | Dispersion medium | Remarks |
| --- | --- | --- | --- | --- | --- |
| III-K(5) | CB | 25 | 5 | CHDV | Dispersion stability bad |
| III-K(10) | CB | 25 | 10 | CHDV | Dispersion stability bad |
| III-K(20) | CB | 25 | 20 | CHDV | |
| III-K(30) | CB | 25 | 30 | CHDV | |
| III-K(35) | CB | 25 | 35 | CHDV | |
| III-Y(10) | P.Y.180 | 25 | 10 | CHDV | Thixotropic |
| III-Y(15) | P.Y.180 | 25 | 15 | CHDV | Dispersion stability bad |
| III-Y(30) | P.Y.180 | 25 | 30 | CHDV | |
| III-Y(40) | P.Y.180 | 25 | 40 | CHDV | |
| III-Y(45) | P.Y.180 | 25 | 45 | CHDV | Thixotropic |
| III-Y(A) | P.Y.180 | 1 | 30 | CHDV | Poor in concentration of color |
| III-Y(B) | P.Y.180 | 3 | 30 | CHDV | Require a little more concentration of color |
| III-Y(C) | P.Y.180 | 10 | 30 | CHDV | |
| III-Y(D) | P.Y.180 | 30 | 30 | CHDV | |
| III-Y(E) | P.Y.180 | 35 | 30 | CHDV | Partial precipitation observed |
| III-C(5) | P.B.15:3 | 25 | 5 | CHDV | Thixotropic |
| III-C(10) | P.B.15:3 | 25 | 10 | CHDV | Dispersion stability bad |
| III-C(20) | P.B.15:3 | 25 | 20 | CHDV | |
| III-C(30) | P.B.15:3 | 25 | 30 | CHDV | |
| III-C(35) | P.B.15:3 | 25 | 35 | CHDV | |
| III-M(15) | P.R.122 | 25 | 15 | CHDV | Thixotropic |
| III-M(20) | P.R.122 | 25 | 20 | CHDV | Thixotropic |
| III-M(30) | P.R.122 | 25 | 30 | CHDV | |
| III-M(40) | P.R.122 | 25 | 40 | CHDV | |
| III-M(45) | P.R.122 | 25 | 45 | CHDV | Thixotropic |
| III-K(30)V | CB | 25 | 30 | CHV | |
| III-K(30) OXT | CB | 25 | 30 | OXT | |
| Comp. Ex. 2 | CB | 25 | 30 | CHDV | Cured within several days |

*The content (%) of pigment is based on a total weight of dispersion medium, and the content (%) of resin is based on the weight of pigment.

EXAMPLE IV

Manufacture of Pigment Dispersion

The surface-modified carbon black (I-K) which was manufactured in Example I-1 and polyester resin having a terminal amino group (Solsperse, Avisia Co., Ltd.) were added to MEK employed as a pre-dispersion medium and then, subjected to a preliminary dispersion treatment by a homogenizer to obtain a dispersion. Then, by using zirconia bead 0.3 mm in diameter and a bead mill, the dispersion was subjected to a reflux treatment for one hour to obtain an MEK solution of microcapsulized pigment (IV-K) (dispersion precursor).

This dispersion precursor was then dried and observed by a transmission electron microscope (TEM), confirming the formation of a film made of polyester resin on the surface of the pigment.

Further, the same procedures as described in Example I-1 were repeated except that the surface-modified carbon black was replaced by the surface-modified yellow pigment (I-Y), the surface-modified magenta pigment (I-M) or the surface-modified cyan pigment (I-C). As a result, it was possible to obtain an MPK solution (dispersion precursor) of a capsulized yellow pigment (IV-Y), a capsulized magenta pigment (IV-M) and a capsulized cyan pigment (IV-C), respectively.

Next, by changing the quantity of the resin to be employed, various dispersion precursors were prepared. To each of these dispersion precursors, an equivalent quantity of neopentane diglycidy ether (SR-NPG, trade name, Sakamoto Yakuhin Co., Ltd.) was added as main dispersing agent. The resultant mixture was stirred for one hour and then heated one hour with stirring at a temperature of 50° C. and a pressure of 50 mmHg, which was followed by a 3-hour heating at a pressure of 5 mmHg to remove MEK. In this manner, various pigment dispersions as shown in the following Table 3 were manufactured. In each of the pigment dispersions obtained in this example, the capsulized pigment was dispersed in SR-NPG employed as a dispersing agent.

Furthermore, untreated carbon black was directly dispersed in SR-NPG to prepare a dispersion of Comparative Example 3 as shown in the following Table 3.

TABLE 3

| Symbols of pigments | Kinds of pigments | Ratio of pigments (%) | Ratio of resin (%) | Dispersion medium | Remarks |
| --- | --- | --- | --- | --- | --- |
| IV-K(5) | CB | 27 | 5 | SR-NPG | Dispersion stability bad |
| IV-K(10) | CB | 27 | 10 | SR-NPG | |
| IV-K(20) | CB | 27 | 20 | SR-NPG | |
| IV-K(30) | CB | 27 | 30 | SR-NPG | |
| IV-K(35) | CB | 27 | 35 | SR-NPG | Viscosity high |
| IV-Y(10) | P.Y.180 | 27 | 10 | SR-NPG | Dispersion stability bad |
| IV-Y(15) | P.Y.180 | 27 | 15 | SR-NPG | |
| IV-Y(30) | P.Y.180 | 27 | 30 | SR-NPG | |
| IV-Y(40) | P.Y.180 | 27 | 40 | SR-NPG | Viscosity slightly high |
| IV-Y(45) | P.Y.180 | 27 | 45 | SR-NPG | Viscosity high |
| IV-C(5) | P.B.15:3 | 27 | 5 | SR-NPG | Dispersion stability bad |
| IV-C(10) | P.B.15:3 | 27 | 10 | SR-NPG | |
| IV-C(20) | P.B.15:3 | 27 | 20 | SR-NPG | |
| IV-C(30) | P.B.15:3 | 27 | 30 | SR-NPG | |
| IV-C(35) | P.B.15:3 | 27 | 35 | SR-NPG | Viscosity high |
| IV-M(15) | P.R.122 | 27 | 15 | SR-NPG | Dispersion stability bad |

TABLE 3-continued

| Symbols of pigments | Kinds of pigments | Ratio of pigments (%) | Ratio of resin (%) | Dispersion medium | Remarks |
|---|---|---|---|---|---|
| IV-M(20) | P.R.122 | 27 | 20 | SR-NPG | |
| IV-M(30) | P.R.122 | 27 | 30 | SR-NPG | |
| IV-M(40) | P.R.122 | 27 | 40 | SR-NPG | Viscosity slightly high |
| IV-M(45) | P.R.122 | 27 | 45 | SR-NPG | Viscosity high |
| IV-M(A) | P.R.122 | 1 | 30 | SR-NPG | Poor in concentration of color |
| IV-M(B) | P.R.122 | 3 | 30 | SR-NPG | Require a little more concentration of color |
| IV-M(C) | P.R.122 | 10 | 30 | SR-NPG | |
| IV-M(D) | P.R.122 | 30 | 30 | SR-NPG | |
| IV-M(E) | P.R.122 | 35 | 30 | SR-NPG | Partial precipitation observed |
| Comp. Ex. 3 | CB | 27 | 30 | SR-NPG | Viscosity very high |

*The content (%) of pigment is based on a total weight of dispersion medium, and the content (%) of resin is based on the weight of pigment.

EXAMPLE V

The pigment dispersions prepared in Examples II to IV were respectively diluted by using a dispersion medium. Then, the particle diameter ($d_1$) after the dilution as well as the particle diameter ($d_2$) after an accelerated heating test were investigated. The particle diameter after the dilution represents a Z average particle diameter which was determined by the measurement using an HPPS measuring apparatus (Malvern Co., Ltd.), and the particle diameter after the accelerated heating test represents a particle diameter after the accelerated heating test which was performed after a two-week storage at a temperature of 60° C.

By using the increasing ratio based on the initial particle diameter ($d_0$), the dispersion stability was evaluated as follows.

(After the dilution) $S_D = ((d_1 - d_0)/d_0)$
A: $SD < 1.2$
B: $1.2 \leq SD < 2$
C: $SD \geq 2$
(After the accelerated heating test) $S_A = ((d_2 - d_0)/d_0)$
A: $SA < 1.2$
B: $1.2 \leq SA < 2$
C: $SA \geq 2$ The results obtained are summarized in the following Tables 4 to 6.

TABLE 4

| Capsulized pigments | Initial particle diameter (nm) | After dilution Particle diameter (nm) | Stability | After accelerated test Particle diameter (nm) | Stability | Remarks |
|---|---|---|---|---|---|---|
| II-K(5) | 240 | 1350 | C | 650 | C | Dispersion stability bad |
| II-K(10) | 230 | 245 | A | 232 | A | |
| II-K(20) | 135 | 145 | A | 138 | A | |
| II-K(30) | 135 | 140 | A | 135 | A | |
| II-K(35) | 250 | 250 | A | 340 | B | Viscosity greatly increased by acceleration |
| II-K(A) | 135 | 140 | A | 135 | A | Poor in concentration of color |
| II-K(B) | 135 | 140 | A | 135 | A | Require a little more concentration of color |
| II-K(C) | 135 | 140 | A | 135 | A | |
| II-K(D) | 145 | 145 | A | 138 | A | |
| II-K(E) | 250 | 250 | A | 340 | B | Precipitation increased by acceleration |
| II-Y(10) | 190 | 1750 | C | 760 | C | Dispersion stability bad |
| II-Y(15) | 150 | 154 | A | 155 | A | |
| II-Y(30) | 145 | 145 | A | 146 | A | |
| II-Y(40) | 160 | 172 | A | 320 | A | Viscosity increased by acceleration |
| II-Y(45) | 220 | 254 | A | 360 | B | Viscosity greatly increased by acceleration |
| II-C(5) | 180 | 2300 | C | 1250 | C | Dispersion stability bad |
| II-C(10) | 150 | 165 | A | 390 | C | |
| II-C(20) | 141 | 142 | A | 145 | A | |
| II-C(30) | 130 | 132 | A | 132 | A | |
| II-C(35) | 135 | 140 | A | 210 | B | Viscosity greatly increased by acceleration |
| II-C(A) | 135 | 140 | A | 142 | A | Poor in concentration of color |
| II-C(B) | 137 | 137 | A | 139 | A | Require a little more concentration of color |
| II-C(C) | 135 | 135 | A | 138 | A | |
| II-C(D) | 132 | 133 | A | 135 | A | |
| II-C(E) | 131 | 141 | A | 182 | B | Precipitation increased by acceleration |
| II-M(15) | 192 | 1370 | C | 895 | C | Dispersion stability bad |
| II-M(20) | 180 | 222 | B | 180 | A | 171   172   A   175   A |
| II-M(40) | 165 | 165 | A | 170 | A | Viscosity increased by acceleration |

TABLE 4-continued

| Capsulized pigments | Initial particle diameter (nm) | After dilution Particle diameter (nm) | Stability | After accelerated test Particle diameter (nm) | Stability | Remarks |
|---|---|---|---|---|---|---|
| II-M(45) | 166 | 175 | A | 236 | B | Viscosity greatly increased by acceleration |
| Comp. Ex. 1 | 148 | 150 | A | 356 | C | Cured as it is accelerated |

*Diluted using C3000

TABLE 5

| Capsulized pigments | Initial particle diameter (nm) | After dilution Particle diameter (nm) | Stability | After accelerated test Particle diameter (nm) | Stability | Remarks |
|---|---|---|---|---|---|---|
| III-K(5) | 250 | 1450 | C | 950 | C | Dispersion stability bad |
| III-K(10) | 241 | 247 | A | 237 | A | |
| III-K(20) | 145 | 152 | A | 147 | A | |
| III-K(30) | 141 | 143 | A | 145 | A | |
| III-K(35) | 263 | 259 | A | 395 | B | Viscosity increased by acceleration |
| III-Y(10) | 155 | 1650 | C | 1269 | C | Dispersion stability bad |
| III-Y(15) | 151 | 154 | A | 155 | A | |
| III-Y(30) | 138 | 143 | A | 148 | A | |
| III-Y(40) | 145 | 153 | A | 277 | B | Viscosity increased by acceleration |
| III-Y(45) | 246 | 248 | A | 395 | B | Viscosity increased by acceleration |
| III-Y(A) | 140 | 145 | A | 149 | A | Poor in concentration of color |
| III-Y(B) | 143 | 150 | A | 148 | A | Require a little more concentration of color |
| III-Y(C) | 139 | 142 | A | 145 | A | |
| III-Y(D) | 139 | 145 | A | 151 | A | |
| III-Y(E) | 142 | 146 | A | 237 | B | Precipitation increased by acceleration |
| III-C(5) | 195 | 3120 | C | 2232 | C | Dispersion stability bad |
| III-C(10) | 159 | 165 | A | 159 | A | |
| III-C(20) | 155 | 159 | A | 161 | A | |
| III-C(30) | 143 | 144 | A | 143 | A | |
| III-C(35) | 156 | 192 | B | 320 | B | Viscosity increased by acceleration |
| III-M(15) | 225 | 1540 | C | 927 | C | Dispersion stability bad |
| III-M(20) | 201 | 230 | A | 221 | A | |
| III-M(30) | 181 | 182 | A | 185 | A | |
| III-M(40) | 172 | 174 | A | 179 | A | |
| III-M(45) | 176 | 195 | A | 298 | B | Viscosity increased by acceleration |
| III-K(30)V | 130 | 136 | A | 135 | A | |
| III-K(30) OXT | 135 | 140 | A | 141 | A | |
| Comp. Ex. 2 | 142 | 150 | A | 1244 | C | Cured as it is accelerated |

*Diluted using CHDV. However, III-K(30)V and III-K(30)OXT were diluted using CHV and OXT, respectively.

TABLE 6

| Capsulized pigments | Initial particle diameter (nm) | After dilution Particle diameter (nm) | Stability | After accelerated test Particle diameter (nm) | Stability | Remarks |
|---|---|---|---|---|---|---|
| IV-K(5) | 245 | 1322 | C | 722 | C | Dispersion stability bad |
| IV-K(10) | 232 | 229 | A | 236 | A | |
| IV-K(20) | 138 | 138 | A | 139 | A | |
| IV-K(30) | 136 | 139 | A | 139 | A | |

TABLE 6-continued

| Capsulized pigments | Initial particle diameter (nm) | After dilution Particle diameter (nm) | Stability | After accelerated test Particle diameter (nm) | Stability | Remarks |
|---|---|---|---|---|---|---|
| IV-K(35) | 295 | 322 | A | 475 | B | Thixotropy developed by acceleration |
| IV-Y(10) | 165 | 1420 | C | 887 | C | Dispersion stability bad |
| IV-Y(15) | 146 | 151 | A | 153 | A | |
| IV-Y(30) | 138 | 143 | A | 143 | A | |
| IV-Y(40) | 155 | 179 | A | 253 | B | Thixotropy developed by acceleration |
| IV-Y(45) | 286 | 259 | A | 368 | B | Thixotropy developed by acceleration |
| IV-C(5) | 177 | 1225 | C | 1220 | C | Dispersion stability bad |
| IV-C(10) | 142 | 144 | A | 145 | A | |
| IV-C(20) | 142 | 155 | A | 152 | A | |
| IV-C(30) | 135 | 140 | A | 141 | A | |
| IV-C(35) | 166 | 181 | A | 247 | B | Thixotropy developed by acceleration |
| IV-M(15) | 195 | 970 | C | 1896 | C | Thixotropy developed by acceleration |
| IV-M(20) | 192 | 213 | A | 209 | A | |
| IV-M(30) | 179 | 187 | A | 179 | A | |
| IV-M(40) | 172 | 172 | A | 176 | A | |
| IV-M(45) | 182 | 206 | A | 325 | B | Thixotropy developed by acceleration |
| IV-M(A) | 177 | 181 | A | 185 | A | Poor in concentration of color |
| IV-M(B) | 175 | 188 | A | 179 | A | Require a little more concentration of color |
| IV-M(C) | 182 | 190 | A | 190 | A | |
| IV-M(D) | 176 | 187 | A | 185 | A | |
| IV-M(E) | 190 | 200 | A | 340 | B | Precipitation increased by acceleration |
| Comp. Ex. 3 | 141 | 162 | A | 1930 | C | Viscosity increased by acceleration |

*Diluted using SR-NPG

It will be seen from the results shown in Table 4 that in the case of carbon black, if it is incorporated at a ratio ranging from 3 parts by weight to 28 parts by weight based on the entire weight of the dispersion medium, it is possible to secure excellent color and dispersion stability. This tendency was found the same in the pigments of other colors.

As shown in Tables 4 to 6, the optimal quantity of resin differs depending on the kind of pigment. For example, in the case of carbon black, the optimal quantity of resin is confined within the range of 10 to 30% based on the weight of the pigment; in the case of benzimidazolone yellow pigment, the optimal quantity of resin is confined within the range of 15 to 39% based on the weight of the pigment; in the case of phthalocyanine cyan pigment, the optimal quantity of resin is confined within the range of 10 to 30% based on the weight of the pigment; and in the case of quinacridone magenta pigment, the optimal quantity of resin is confined within the range of 20 to 39% based on the weight of the pigment. In any of these cases, if the content of resin is smaller than these ranges, the dispersion stability would deteriorate, and if the content of resin is larger than these ranges, the viscosity of ink may be badly affected.

In the cases of Comparative Examples 1 to 3 where a pigment was directly dispersed in a cation polymeric compound (dispersion medium), it was confirmed that the pigment dispersions were all caused to solidify or increase in viscosity in the accelerated heating test. The reason for this may be attributed assumably to the reactions among the pigment, the resin and the dispersion medium.

Further, it was confirmed that even if the aforementioned capsulized pigments and dispersion methods were applied to the following cation polymeric compounds, it was possible to ensure the stability in viscosity as well as particle diameter.

OXT (di[1-ethyl(3-oxetanyl)]methyl ether: OXT-221 (trade name); Toa Gosei Co., Ltd.); and CHV (cyclohexane dimethanoldivinyl ether: Rapicure CHVE (trade name); ISP Japan Co., Ltd.)

EXAMPLE VI

When the pigment dispersion II-K(30) prepared in Example II was left to stand, the viscosity thereof was increased from the initial viscosity of 72.3 mPa.s to a viscosity of 85.4 mPa.s. However, when dimethylaniline (DA) was added to the pigment dispersion at a ratio of 0.5% based on the entire quantity of the dispersion medium (C3000), it was possible to suppress the increase of viscosity. In this case, it was possible to control the viscosity of the pigment dispersion to 76.0 mPa.s after the standing thereof for six months, thus indicating excellent stability.

It was also found that the addition of a basic compound as a viscosity stabilizer is effective even in any of limonene diepoxide-containing system.

EXAMPLE VII

The Preparation of Liquid Ink

By selecting some of excellent samples from the dispersions shown in Tables 1 to 3, several liquid inks are prepare in a formulation as shown in following Table 7. In Table 7, OXT incorporated as the dispersion medium 2 is the aforementioned oxetane compound, (di[1-ethyl(3-oxetanyl)]methyl ether: OXT-221 (trade name); Toa Gosei Co., Ltd.). Further, as for the photo-acid generating agent PAG, UVACURE1591 (a 50% propylene carbonate solution of phenylsulfonium hexafluorophosphate-based onium salt mixture; Daicel UCB Co., Ltd.) was employed as it was. Incidentally, for the system containing C3000, DMA was added thereto as a stabilizing agent at a ratio of 10% based on the photo-acid generating agent. In either samples, the content of the pigments was adjusted to 5 wt % based on the acid polymeric compound (dispersion medium).

Further, by using the dispersion liquids of Comparative Examples 1 to 3, the liquid inks of Comparative Examples 5 and 6 were prepared.

liquid inks were subjected to centrifugal separation for 20 minutes at 15000 G and only 90% of the supernatant was taken up for use. As for the recording medium 2, the ordinary enameled paper was employed. As for the light source 5, an ultra-high pressure mercury lamp having an output of 230 W was employed with the exposure dosage thereof being set to 500 mJ/cm$^2$. Further, the temperature of the recording head 4 was maintained at a temperature of 45° C. As for the heating mechanism 6, a 600 W infrared ceramic heater was employed.

The pencil hardness, printing stability, solvent resistance and image quality of the ink layer thus formed were measured, the results being shown in the following Table 8.

The printing stability was indicated by the frequency of delivery error (the number of times) per 24 hours. However, the samples which indicated delivery failure within 2 or 3 days were marked with a symbol of "x". The solvent resistance was evaluated such that the sample which was resistive only to water was marked with the number of 1, the sample which was resistive to water and ethanol was marked with the number of 2, and the sample which was resistive to all of water, ethanol and acetone was marked with the number of 3.

TABLE 7

| Liquid ink | Capsulized pigments Kinds | Quantity added | Dispersion medium 1 (quantity added) | Dispersion medium 2 (quantity added) | Quantity of PAG |
|---|---|---|---|---|---|
| VII-K(30) | II-K(30) | 18.5 | C3000(31.5) | SR-NPG(50) | 8 |
| VII-Y(30) | II-Y(30) | 18.5 | C3000(31.5) | SR-NPG(50) | 8 |
| VII-C(30) | II-C(30) | 18.5 | C3000(31.5) | SR-NPG(50) | 8 |
| VII-M(30) | II-M(30) | 18.5 | C3000(31.5) | SR-NPG(50) | 8 |
| IX-K(30) | III-K(30) | 20 | CHDV(80) | None | 8 |
| IX-Y(30) | III-Y(30) | 20 | CHDV(80) | None | 8 |
| IX-C(30) | III-C(30) | 20 | CHDV(80) | None | 8 |
| IX-M(30) | III-M(30) | 20 | CHDV(80) | None | 8 |
| X-K(30) | IV-K(30) | 18.5 | SR-NPG(31.5) | OXT(50) | 8 |
| X-K(30)OXT | III-K(30)OXT | 20 | SR-NPG(50) | OXT(30) | 8 |
| X-K(30)V | III-K(30)V | 20 | CHV(30) | OXT(50) | 8 |
| X-Y(30) | IV-Y(30) | 18.5 | SR-NPG(31.5) | OXT(50) | 8 |
| X-C(30) | IV-C(30) | 18.5 | SR-NPG(31.5) | OXT(50) | 8 |
| X-M(30) | IV-M(30) | 18.5 | SR-NPG(31.5) | OXT(50) | 8 |
| Comp. Ex. 4 | Comp. Ex. 1 | 18.5 | C3000(31.5) | SR-NPG(50) | 8 |
| Comp. Ex. 5 | Comp. Ex. 2 | 20 | CHDV(80) | None | 8 |
| Comp. Ex. 6 | Comp. Ex. 3 | 18.5 | SR-NPG(31.5) | OXT(50) | 8 |

In Table 7, the mixing ratios of the capsulized pigments and dispersion mediums 1 and 2 were values based on the weight of the liquid ink composition which was set to 100 and wherein the weight of the photo-acid generating agent PAG was excluded.

Next, by using the ink-jet recording apparatus shown in FIG. 1, the performance test of each of the liquid inks was performed.

The liquid inks shown in Table 7 were employed as they were, or after subjecting them to a treatment wherein the The quality of image was determined visually and the image having any problem was illustrated about the situation thereof. Incidentally, in the case of the sample where a slight degree of disturbance (such as mis-direction shot) could be more or less observed in its image but the level of the disturbance was such that could not be noticed of unless it was investigated in detail, the sample was defined as good. The sample which was completely free form any error shot was defined as excellent.

TABLE 8

| Liquid ink | Centrifugal separation | Pencil hardness | Printing stability | Solvent resistance | Printing quality |
|---|---|---|---|---|---|
| VII-K(30) |  | F(H) | 24 | 1 | Good |
| VII-K(30) | Yes | H | 2 | 1 | Excellent |
| VII-Y(30) |  | F(H) | 12 | 1 | Good |
| VII-Y(30) | Yes | F(H) | 4 | 1 | Excellent |
| VII-C(30) |  | F(H) | 10 | 1 | Good |

TABLE 8-continued

| Liquid ink | Centrifugal separation | Pencil hardness | Printing stability | Solvent resistance | Printing quality |
|---|---|---|---|---|---|
| VII-C(30) | Yes | F(H) | 2 | 1 | Excellent |
| VII-M(30) | | F(H) | 15 | 1 | Good |
| VII-M(30) | Yes | H | 3 | 1 | Excellent |
| IX-K(30) | | 2H | 27 | 3 | Good |
| IX-K(30) | Yes | 2H | 3 | 3 | Excellent |
| IX-Y(30) | Yes | 2H | 5 | 3 | Excellent |
| IX-C(30) | Yes | 2H | 4 | 3 | Excellent |
| IX-M(30) | Yes | 2H | 6 | 3 | Excellent |
| X-K(30) | | H | 18 | 3 | Good |
| X-K(30) | Yes | H(2H) | 1 | 3 | Excellent |
| X-K(30) OXT | Yes | H(2H) | 2 | 3 | Excellent |
| X-K(30)V | Yes | H(2H) | 4 | 3 | Excellent |
| X-Y(30) | Yes | H | 0 | 3 | Excellent |
| X-C(30) | Yes | H | 2 | 3 | Excellent |
| X-M(30) | Yes | H | 5 | 3 | Excellent |
| Comp. Ex. 4 | | F(H) | 48 → x | 1 | Bleeding |
| Comp. Ex. 4 | Yes | F(H) | 45 → x | 1 | Bleeding |
| Comp. Ex. 5 | | 2H | 35 → x | 3 | Non-uniform printing |
| Comp. Ex. 5 | Yes | 2H | 36 → x | 3 | Non-uniform printing |
| Comp. Ex. 6 | | H | 44 → x | 3 | Non-uniform printing |
| Comp. Ex. 6 | Yes | H | 47 → x | 3 | Non-uniform printing |

As shown in Table 8, all of the inks according to the Examples of the present invention were relatively stable in the performance of printing and the images to be obtained were also excellent. Especially, it will be recognized that when the ink was subjected to centrifugal separation, the delivery stability could be further improved.

On the other hand, the inks of Comparative Examples were such that although the delivery of ink was possible in the initial stage, the stability of delivery of ink was poor so that trouble of delivery such as the clogging of head may occur with the lapse of time.

In place of SR-NPG pigment dispersion constituted by IV-K(30), OXT pigment dispersion constituted by III-K(30) OXT which was employed to prepare an ink (X-K(30), X-K(30)OXT) wherein the ultimate content of the pigment is adjusted to become identical with the content of composition of dispersion medium. When this ink was employed for printing, it was possible to maintain the stability of printing.

EXAMPLE IX

In order to enhance the sensitivity of ink, the mixing ratio of the photo-acid generating agent in the compositions shown in Table 7 was increased two times (16%) to prepare several kinds of ink, which were then left to stand for two months, and the distribution of particle diameter thereof was measured by using a particle size analyzer. As a result, an increase of particles having a particle size ranging from 3 to 4 μm was recognized. When these inks were filtered and analyzed, the presence of-crystal of onium salt in the photo-acid generating agent was recognized.

When MEK or MPK was added to the liquid ink having the same composition as described above at a ratio of 0.5 to 3% based on the entire weight of the dispersion medium, the precipitation of the aforementioned crystal was not recognized.

COMPARATIVE EXAMPLE

Polyester resin having a terminal amino group (Solsperse, Avisia Co., Ltd.) was added to the surface-modified pigment I-K at a ratio of 30 wt % to obtain a mixture, which was then added to a pre-dispersion medium constituted by isopropanol (IPA). This IPA is known as exhibiting a high polarity since the solubility parameter thereof is approximately 23.5 $\text{MPa}^{1/2}$ due to the presence of the hydroxyl group thereof.

After the resultant mixture was subjected to a preliminary dispersion treatment by a homogenizer, the resultant dispersion was subjected to a reflux treatment for one hour by using zirconia bead 0.3 mm in diameter and a bead mill to prepare a dispersion precursor. Further, an equivalent quantity of a main dispersion medium constituted by SR-NPG was added to the dispersion precursor and the resultant mixture was stirred for one hour and then heated one hour with stirring at a temperature of 50° C. and a pressure of 50 mmHg, which was followed by a 3-hour heating at a pressure of 5 mmHg to remove IPA. As a result, a pigment dispersion wherein a resin-coated pigment was dispersed in the SR-NPG was obtained.

As this pigment dispersion was observed by using a particle size analyzer (HPPS; Malvern Co., Ltd.) where a dynamic light-scattering method was utilized, the particle diameter of the resin-coated pigment was found 500 nm or more, indicating that the employment of a solvent having an extremely high polarity as a pre-dispersion medium was not preferable.

On the other hand, polyester resin having a terminal amino group (Solsperse, Avisia Co., Ltd.) was added to the surface-modified pigment I-K at a ratio of 30 wt % to obtain a mixture, which was then added to a pre-dispersion medium constituted by cyclohexane (CH). This CH is known as exhibiting a low polarity since the solubility parameter thereof is approximately 16.8 $\text{MPa}^{1/2}$ because of the molecular structure thereof.

After the resultant mixture was subjected to a preliminary dispersion treatment by a homogenizer, the resultant dispersion was subjected to a reflux treatment for one hour by using zirconia beads 0.3 mm in diameter and a beads mill to prepare a dispersion precursor. Further, an equivalent quantity of a main dispersion medium constituted by SR-NPG was added to the dispersion precursor and the resultant mixture was stirred for one hour and then heated one hour with stirring at a temperature of 50° C. and a pressure of 50 mmHg, which was followed by a 3-hour heating at a pressure of 5 mmHg to remove CH. As a result, a pigment dispersion wherein a resin-coated pigment was dispersed in the SR-NPG was obtained.

As this pigment dispersion was observed by using a particle size analyzer (HPPS; Malvern Co., Ltd.), the particle diameter of the resin-coated pigment was found 600 nm or more, indicating that the employment of a solvent having an extremely low polarity as a pre-dispersion medium was not preferable.

As explained above, according to one aspect of the present invention, there is provided a pigment dispersion and a liquid ink precursor both being useful for the preparation of a UV-curing type ink-jet ink and featured in that they are minimal in fluctuation of viscosity, excellent in stability of components, and free from deterioration of dispersibility. According to another aspect of the present invention, there is provided a recording method wherein the aforementioned UV-curing type ink for ink-jet recording is employed. According to a further aspect of the present invention, there is provided a printed matter which is free from defective printing and excellent in quality of printing. According. to a further aspect of the present invention, there is provided a method of manufacturing a pigment dispersion which is minimal in fluctuation of viscosity, excellent in stability of components, and free from deterioration of dispersibility.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A UV curing type liquid ink precursor comprising:
    a pigment dispersion which comprises a resin-coated pigment comprising a resin and a pigment, and having an average particle diameter of 250 nm or less; and a dispersion medium having a viscosity of 30 mPa.s or less at a temperature of 25° C. and a boiling point of 150° C. or more at 1 atm, the dispersion medium containing as a major component a cation polymeric compound and containing at least one selected from the group consisting of limonene diepoxide, neopentyl glycol diglycidyl ether, di[1-ethyl(3-oxetanyl)]methyl ether and cyclohexane vinyl ether; and
    a photo-acid generating agent;
    wherein a mixing ratio of the pigment is confined within the range of 3 to 41% by weight based on a total weight of the dispersion medium, and a ratio of the resin in the resin-coated pigment is confined within the range of 5 to 37% by weight based on the weight of the pigment.

2. An ink-jet recording method comprising a step of using an ink containing a UV curing type liquid ink precursor which is claimed in claim 1.

3. A printed matter comprising an image formed of cured ink containing a UV curing type liquid ink precursor which is claimed in claim 1.

4. A method of manufacturing a pigment dispersion comprising:
    subjecting a pigment to surface treatment to provide the pigment with a functional group to obtain a surface-modified pigment;
    either coating the surface-modified pigment with a resin at a ratio of 5 to 37% by weight based on the weight of the surface-modified pigment and then dispersing the resin-coated pigment in a preliminary dispersion medium at a ratio ranging from 10% by weight to 41% by weight based on a total weight of the preliminary dispersion medium to obtain a dispersion precursor which is dispersed in the preliminary dispersion medium having a boiling point not more than 140° C. at 1 atm; or adding 10% to 41% by weight (based on a total weight of a preliminary dispersion medium) of the surface-modified pigment and 5 to 37% by weight (based on the surface-modified pigment) of the resin to the preliminary dispersion medium having a boiling point not more than 140° C. at 1 atm to obtain a dispersion precursor where the resin-coated pigment composed of the surface-modified pigment and the resin is dispersed in the preliminary dispersion medium;
    adding a main dispersion medium having a viscosity of 30 mPa.s or less at a temperature of 25° C. and a boiling point of 150° C. or more at 1 atm to the dispersion precursor and mixing them to obtain a mixture; and
    subjecting the mixture to distillation at a temperature of not higher than 70° C. and under a reduced pressure to remove the preliminary dispersion medium to obtain the pigment dispersion where the resin-coated pigment is dispersed in the main dispersion medium.

5. The method according to claim 4, wherein the pigment dispersion contains aggregated particles having a particle diameter of 1 μm or more, the method further comprising removing the preliminary dispersion medium by distillation and subjecting the aggregated particles to centrifugal separation for a period ranging from 5 minutes to 3 hours while applying a gravity of 2500 G to 70000 G to the aggregated particles.

* * * * *